US012062136B2

United States Patent
Choi et al.

(10) Patent No.: US 12,062,136 B2
(45) Date of Patent: Aug. 13, 2024

(54) MIXED REALITY-BASED DISPLAY DEVICE AND ROUTE GUIDE SYSTEM

(71) Applicant: LG ELECTRONICS INC., Seoul (KR)

(72) Inventors: Sunghwan Choi, Seoul (KR); Yujung Jang, Seoul (KR); Kihyung Lee, Seoul (KR); Seungman Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/550,422

(22) PCT Filed: Jul. 12, 2022

(86) PCT No.: PCT/KR2022/010139
§ 371 (c)(1),
(2) Date: Sep. 13, 2023

(87) PCT Pub. No.: WO2023/287169
PCT Pub. Date: Jan. 19, 2023

(65) Prior Publication Data
US 2024/0177418 A1    May 30, 2024

Related U.S. Application Data

(60) Provisional application No. 63/221,467, filed on Jul. 13, 2021.

(51) Int. Cl.
*G06T 11/00* (2006.01)
*B60K 35/23* (2024.01)
(Continued)

(52) U.S. Cl.
CPC .............. *G06T 17/05* (2013.01); *B60K 35/23* (2024.01); *B60K 35/28* (2024.01); *G01C 21/365* (2013.01);
(Continued)

(58) Field of Classification Search
CPC ........... G06T 17/05; G06T 7/73; G06T 15/04; G06T 11/001; G06T 2207/10028;
(Continued)

(56) References Cited

U.S. PATENT DOCUMENTS 7,860,301 B2 * 12/2010 Se ........................... G06T 7/285
348/43
8,564,607 B2 * 10/2013 Lee ........................ G06T 11/001
345/582
(Continued)

FOREIGN PATENT DOCUMENTS

JP    2003294457    10/2003
KR    10-2016-0059376    5/2016
(Continued)

OTHER PUBLICATIONS

Korean Intellectual Property Office Application No. 10-2023-7013935, Office Action dated Sep. 15, 2023, 7 pages.
(Continued)

*Primary Examiner* — Wesner Sajous
(74) *Attorney, Agent, or Firm* — LEE, HONG, DEGERMAN, KANG & WAIMEY

(57) ABSTRACT

The present invention relates to a display device comprising: a communication unit for communicating with a cloud server; an interface unit for obtaining an image of the periphery of a vehicle by means of a camera, and receiving sensing information collected from at least one sensor; an MR module for rendering MR information, comprising a virtual object, on the basis of the sensing information and map information received from the cloud server; and a processor extracting an image, corresponding to a lateral surface of a building around the vehicle, from the obtained image, generating a texture image corresponding to the lateral surface of the building from the extracted image and transmitting same to the cloud server, receiving, from the
(Continued)

cloud server, map information comprising models of buildings to which building textures on the basis of texture images are mapped, and displaying MR information rendered on the basis of the map information on a display provided in the vehicle.

17 Claims, 23 Drawing Sheets

(51) Int. Cl.
*B60K 35/28* (2024.01)
*G01C 21/36* (2006.01)
*G06F 3/048* (2013.01)
*G06N 3/04* (2023.01)
*G06T 7/73* (2017.01)
*G06T 15/04* (2011.01)
*G06T 17/05* (2011.01)
*G06T 19/00* (2011.01)
*G06V 10/00* (2022.01)
*G06V 20/56* (2022.01)

(52) U.S. Cl.
CPC .............. *G06T 7/73* (2017.01); *G06T 15/04* (2013.01); *G06V 20/56* (2022.01); *B60K 2360/166* (2024.01); *B60K 2360/177* (2024.01); *B60K 2360/21* (2024.01); *G06T 2207/10028* (2013.01); *G06T 2207/30252* (2013.01)

(58) Field of Classification Search
CPC ........... G06T 2207/30252; G06T 19/20; G06T 2210/61; G01C 21/365; G01C 21/3602; G01C 21/3647; G01C 21/3638; G01C 21/3644; G01C 21/2664; G01C 21/3885; G01C 21/3667; G01C 21/36; G06V 20/56; G06V 10/00; B60K 35/28; B60K 35/23; B60K 2360/21; B60K 2360/166; B60K 2360/177; B60W 50/14; G06N 3/04; G06N 3/08; G06F 3/04815; G06Q 50/40; H04N 21/414; H04N 21/44008
See application file for complete search history.

(56) References Cited

U.S. PATENT DOCUMENTS

| | | | | |
|---|---|---|---|---|
| 11,276,234 | B2* | 3/2022 | Choi | G06T 19/006 |
| 2018/0213359 | A1 | 7/2018 | Reinhardt et al. | |
| 2020/0042083 | A1* | 2/2020 | Min | G06F 3/013 |
| 2020/0153885 | A1* | 5/2020 | Lee | G06T 15/04 |
| 2020/0255026 | A1 | 8/2020 | Katardjiev et al. | |
| 2020/0312005 | A1 | 10/2020 | Desai et al. | |
| 2021/0117214 | A1 | 4/2021 | Presant et al. | |
| 2021/0125411 | A1* | 4/2021 | Choi | G06F 3/013 |
| 2021/0150236 | A1* | 5/2021 | Yu | G06V 20/56 |

FOREIGN PATENT DOCUMENTS

| | | |
|---|---|---|
| KR | 10-2017-0005602 | 1/2017 |
| KR | 10-2017-0056752 | 5/2017 |
| KR | 10-2017-0127342 | 11/2017 |
| KR | 10-2019-0085894 | 7/2019 |
| KR | 10-2019-0109336 | 9/2019 |
| KR | 10-2020-0060651 | 6/2020 |
| KR | 10-2020-0063889 | 6/2020 |
| KR | 10-2135256 | 7/2020 |
| KR | 10-2173286 | 11/2020 |
| KR | 10-2174524 | 11/2020 |
| KR | 10-2235474 | 4/2021 |
| KR | 10-2021-0048739 | 5/2021 |
| KR | 10-2021-0059980 | 5/2021 |
| KR | 10-2021-0080936 | 7/2021 |
| KR | 10-2021-0085789 | 7/2021 |
| KR | 10-2021-0087271 | 7/2021 |
| WO | 2012-113972 | 8/2012 |

OTHER PUBLICATIONS

PCT International Application No. PCT/KR2022/010139, International Search Report dated Oct. 19, 2022, 4 pages.
PCT International Application No. PCT/KR2022/010107, Written Opinion and International Search Report dated Oct. 14, 2022, 9 pages.
PCT International Application No. PCT/KR2022/010102, Written Opinion and International Search Report dated Oct. 26, 2022, 10 pages.
PCT International Application No. PCT/KR2022/010149, Written Opinion and International Search Report dated Oct. 26, 2022, 9 pages.
PCT International Application No. PCT/KR2022/010103, Written Opinion and International Search Report dated Nov. 10, 2022, 9 pages.
PCT International Application No. PCT/KR2022/010144, Written Opinion and International Search Report dated Oct. 7, 2022, 10 pages.
PCT International Application No. PCT/KR2022/010147, Written Opinion and International Search Report dated Oct. 12, 2022, 11 pages.
PCT International Application No. PCT/KR2022/010151, Written Opinion and International Search Report dated Oct. 25, 2022, 10 pages.

* cited by examiner

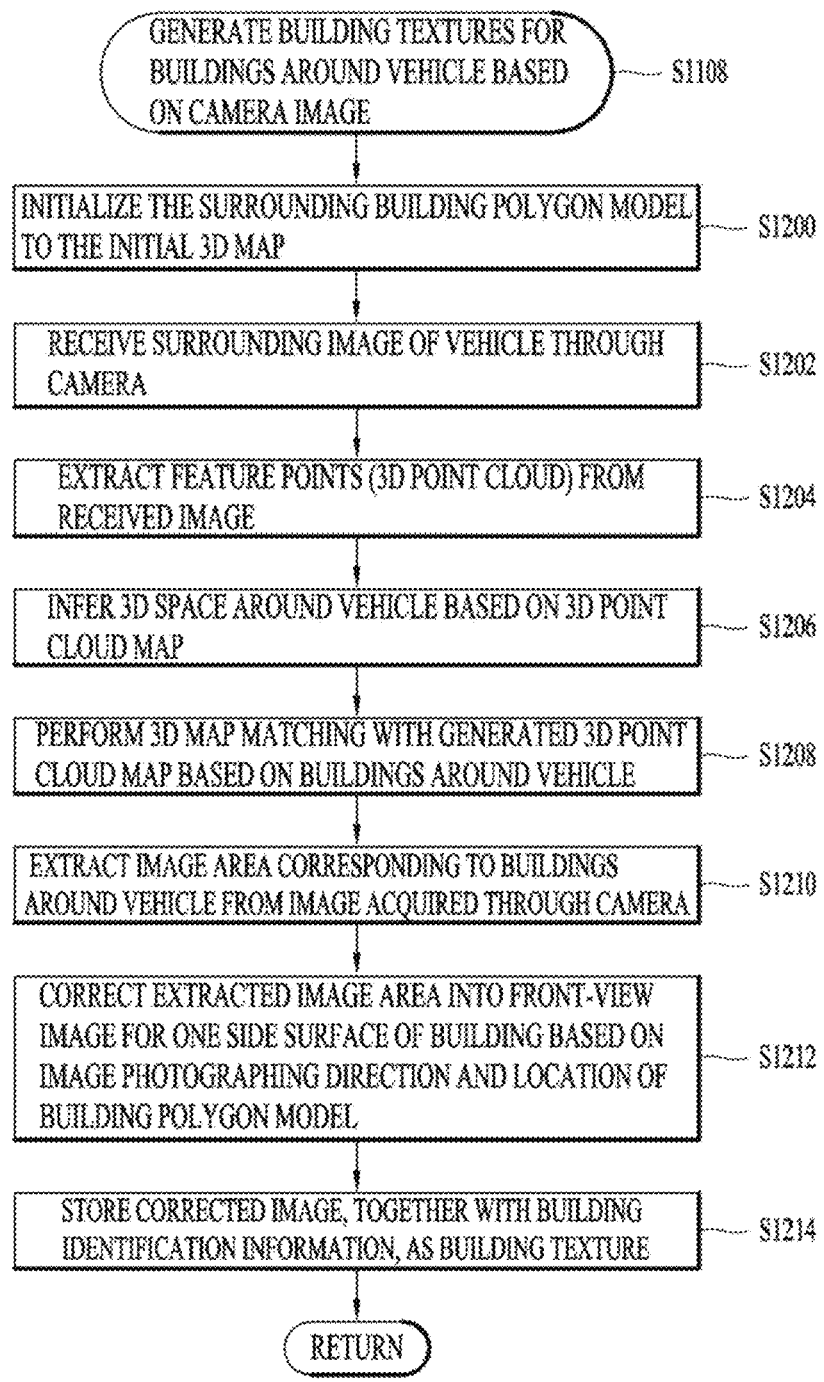

FIG. 14
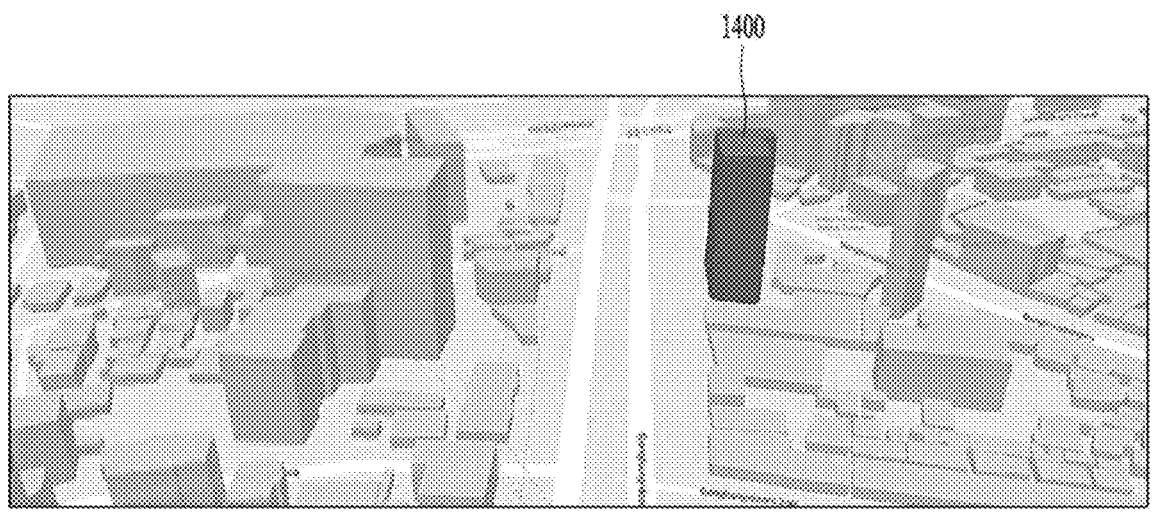
(a)
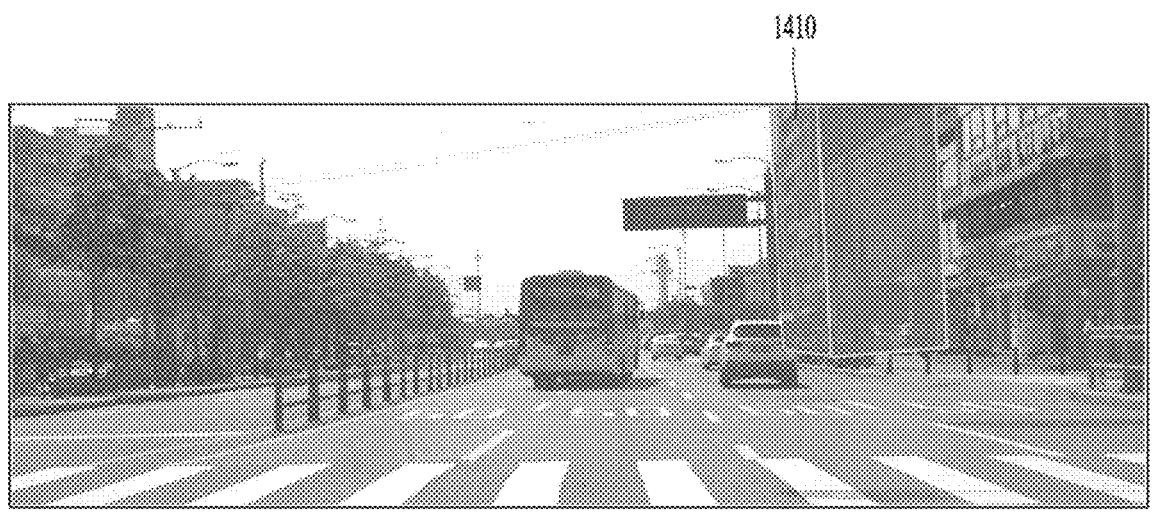
(b)

FIG. 15
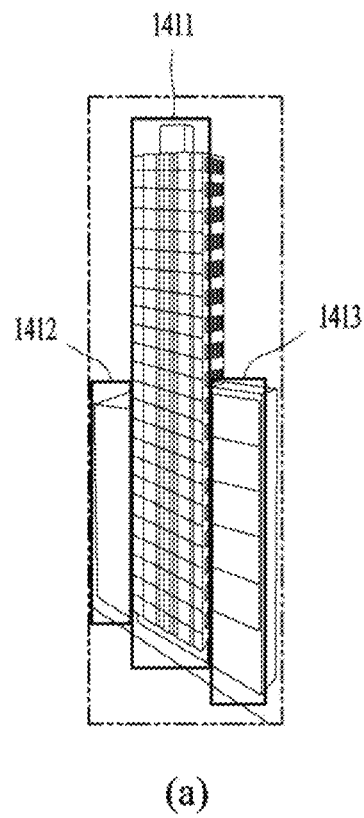
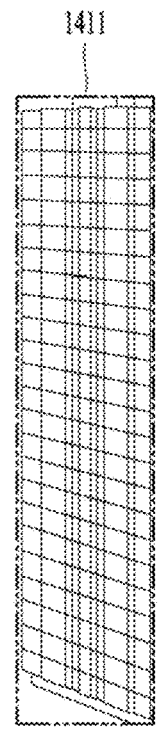
(a)  (b)
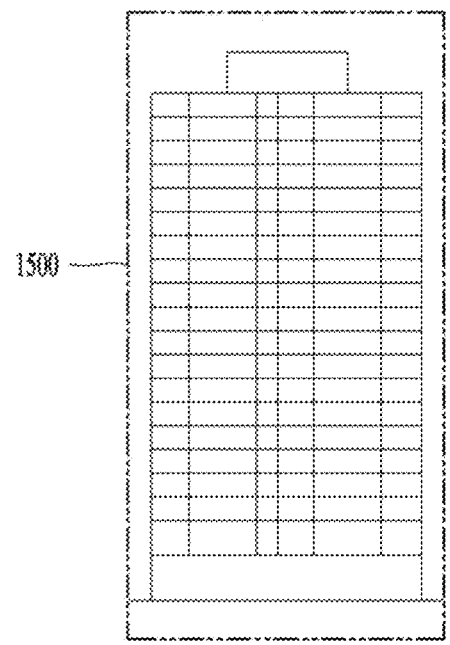
(c)

FIG. 17
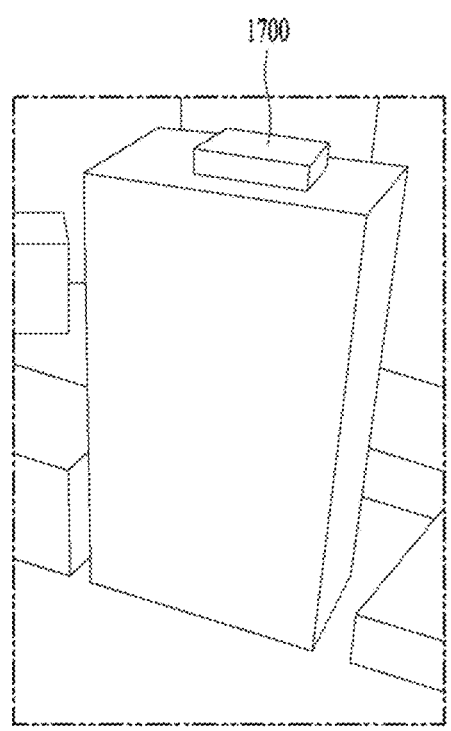
(a)
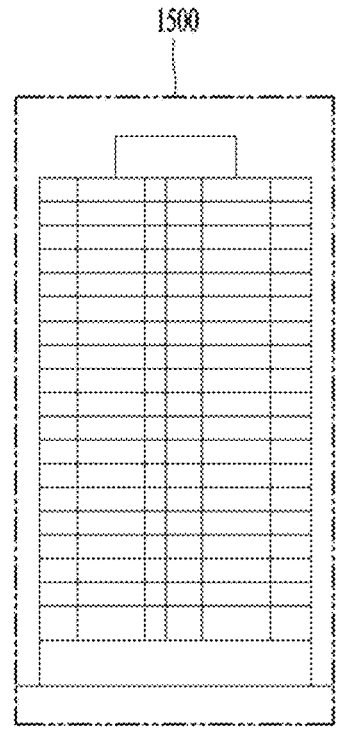
(b)
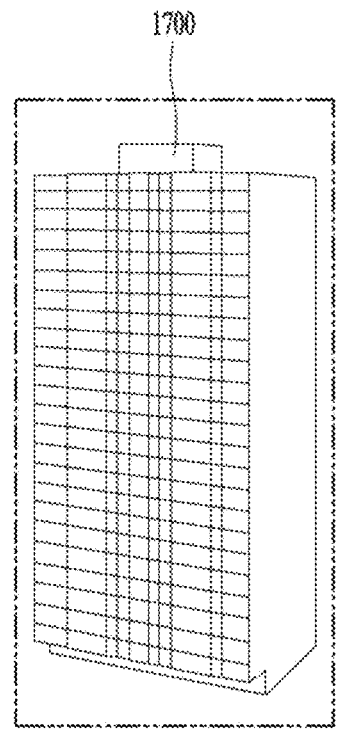
(c)

FIG. 18
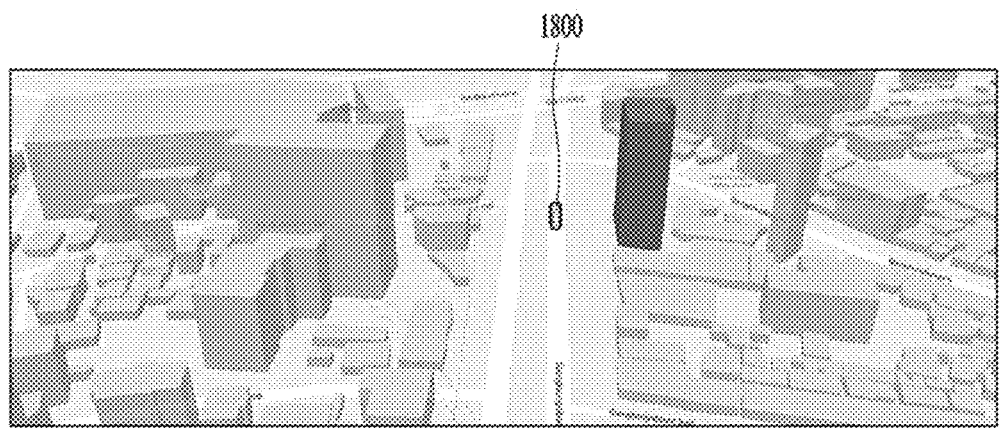
(a)
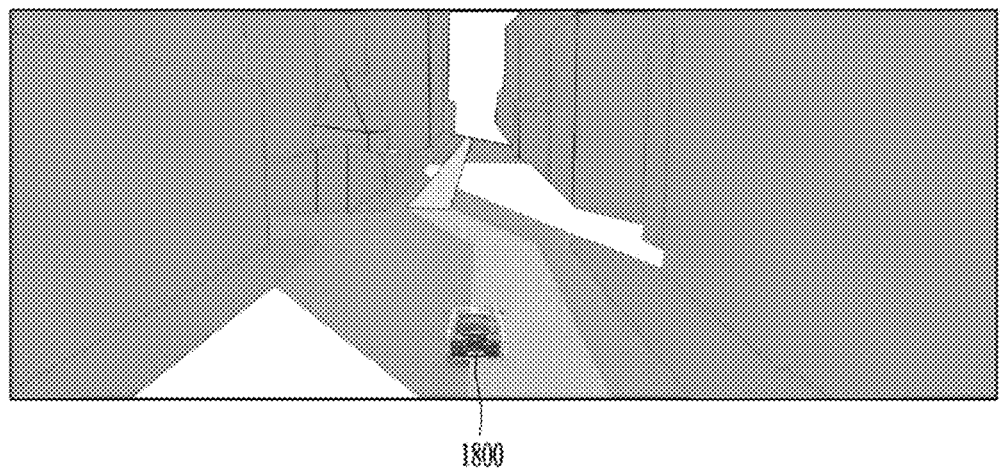
(b)

FIG. 19
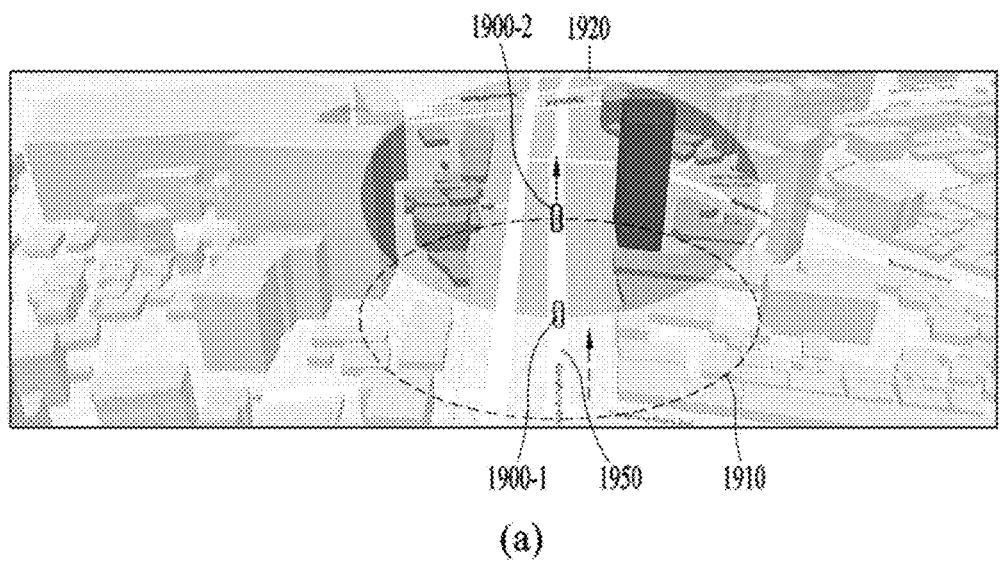
(a)
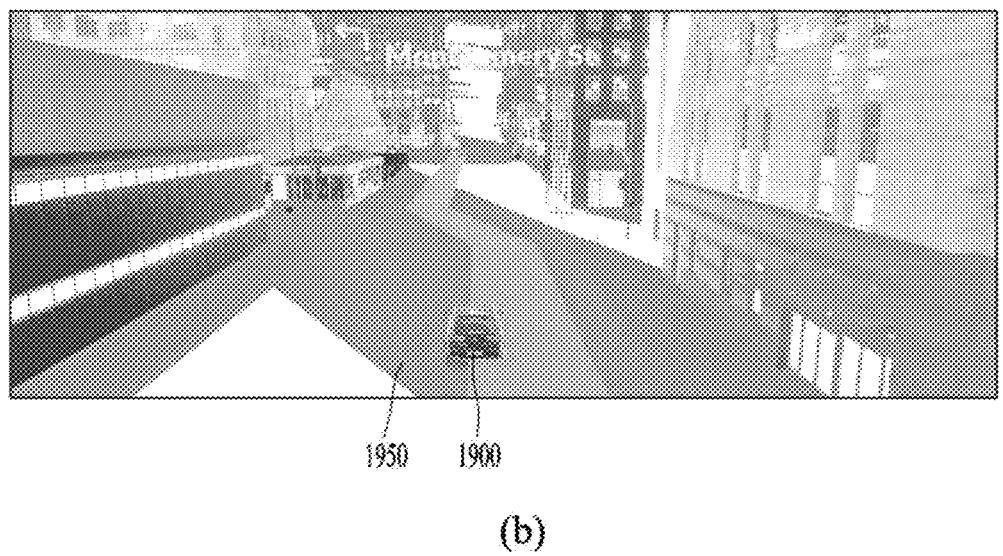
(b)

MIXED REALITY-BASED DISPLAY DEVICE AND ROUTE GUIDE SYSTEM

CROSS-REFERENCE TO RELATED APPLICATIONS

This application is the National Stage filing under 35 U.S.C. 371 of International Application No. PCT/KR2022/010139, filed on Jul. 12, 2022, which claims the benefit of U.S. Provisional Application No. 63/221,467, filed on Jul. 13, 2021, the contents of which are all hereby incorporated by reference herein in their entireties.

TECHNICAL FIELD

The present disclosure relates to a display device and a route guide system for guiding a route for a vehicle to travel.

BACKGROUND ART

Recently, development of a technology related to mixed reality (MR), which can provide various simulation information related to a vehicle by applying digital twinning (DT) is actively in progress, following augmented reality (AR) which outputs a graphic object through a windshield or a head-up display (HUD) of a vehicle or additionally outputs a graphic object in real world by using a graphic object using an image captured by a camera.

As an effort of developing such MR-related technology, a method of providing information related to route guidance to a driver using the MR is being actively researched. The route guidance using the MR has an advantage of providing a driver with various types of information that the driver in a cockpit cannot check, such as displaying a graphic object corresponding to a vehicle on a 3D map digitized through the digital twinning technology and providing information related to a driving route on which the driver has not driven the vehicle yet through the map and the graphic object, or providing a viewing angle such as a bird view.

In order for a driver to obtain accurate information through route guidance using mixed reality, a high matching rate between a map digitized through the digital twinning technology, that is, a digital twin map, and the real world is required. For this purpose, it is necessary to provide a 3D map rather than a 2D map. Accordingly, service providers that provide digital twin maps currently provide 3D maps obtained by mapping 2D maps to 3D maps.

However, those service providers currently use building modeling using satellite or aerial photos to provide 3D mapping. In the case of using the satellite or aerial photos, it is difficult to obtain images of various side (lateral) surfaces of a building because such images are captured at an angle of elevation. This causes a difficulty in providing accurate textures for the building. Accordingly, a typical 3D map is provided in the form of polygon data having a footprint of a bottom surface and height of the building.

However, the 3D map including building modeling provided in the form of polygon data has a problem in that it does not include accurate textures of the building. As such, the 3D map including the polygon modeling only shows a location and 3D volume of the building, but there is a difference from an actual shape of the building. This difference causes a gap between the digital twin map and the real world, which makes it difficult to provide correct information to a driver.

DISCLOSURE OF INVENTION

Technical Problem

The present disclosure is directed to solving the aforementioned problems and other drawbacks.

One aspect of the present disclosure is to provide a display device and a route guide system capable of providing a mixed reality (MR)-based route guidance service through a digital twin map using building modeling of textures corresponding to shapes of each side surface of the building.

Another aspect of the present disclosure is to provide a route display device and a route guide system capable of providing a mixed reality (MR)-based route guidance service through a digital twin map that is more similar to the real world at a lower cost.

Solution to Problem

A display device in accordance with one embodiment of the present disclosure may include: a communication unit configured to communicate with a cloud server; an interface unit configured to acquire an image around a vehicle by a camera disposed in the vehicle and receive sensing information collected from at least one sensor disposed in the vehicle; a mixed reality (MR) module configured to render MR information, including at least one virtual object, based on the sensing information and map information received from the cloud server; and a processor configured to extract a building image corresponding to one side surface of a building around the vehicle from the acquired image, generate a texture image corresponding to the one side surface of the building from the extracted building image, transmit the generated texture image to the cloud server, receive from the cloud server updated map information including building models around the vehicle, the building models each having a surface to which a building texture based on the texture image has been mapped, and control the interface unit to output MR information rendered based on the updated map information to a display.

In one embodiment, the map information provided from the cloud server is map information within a predetermined area set based on a location of the vehicle, and the location of the vehicle is a current location of the vehicle or an expected location of the vehicle estimated based on a driving route, driving speed, and the current location of the vehicle.

In one embodiment, the processor transmits to the cloud server the texture image generated from the building image corresponding to the one side surface of the building around the vehicle according to a result of detection of a building model with a surface, to which a building texture has not been mapped, among the building models included in the map information received from the cloud server.

The processor detects feature points from the image around the vehicle according to a point cloud method, detects one area on a point cloud map that matches a building model corresponding to a specific building around the vehicle, based on a result of three-dimensional (3D) matching between a point cloud map generated based on the detected feature points and the map information provided from the cloud server, and extracts an image area corresponding to one side surface of the specific building from the image around the vehicle based on the detected one area on the point cloud map.

In one embodiment, the processor generates the point cloud map from the image around the vehicle and performs the 3D matching, based on Simultaneous Localization And Map-Building (SLAM) algorithm.

In one embodiment, the processor generates a front-view image of the one side surface of the specific building by correcting the extracted image area according to a photographing angle of the camera, and transmits the generated front-view image to the cloud server as a texture image for the one side surface of the specific building.

In one embodiment, the specific building is a building corresponding to the building model with the surface, to which the building texture has not been mapped, among the building models included in the map information received from the cloud server.

In one embodiment, the building texture is generated by the cloud server in a manner of synthesizing a plurality of texture images generated based on different images, which are obtained by photographing one side surface of a specific building, and the different images are images having a difference in at least one of a direction, a distance, and a time that the photographing has been performed.

In one embodiment, the cloud server collects the plurality of texture images from a plurality of different vehicles, generates the building texture corresponding to the one side surface of the specific building when a number of the collected texture images reaches a predetermined number, and maps the generated building texture to the one side surface of the specific building.

In one embodiment, the building texture is generated by the cloud server in a manner of synthesizing the plurality of texture images according to an artificial intelligence algorithm based on deep learning, and the artificial intelligence algorithm is a Deep Neural Network (DNN)-Generative Adversarial Network (GAN) algorithm based on a semantic class label.

A route guide system according to one embodiment of the present disclosure includes at least one route guide device disposed in a vehicle and configured to transmit a texture image corresponding to one side surface of a specific building based on an image acquired by a camera of the vehicle, receive three-dimensional (3D) map information in response to the transmission, and display mixed reality (MR) information, rendered based on the received 3D map information, on a display of the vehicle; and a cloud server configured to collect a plurality of texture images corresponding to the one side surface of the specific building, map a building texture synthesized from the collected plurality of texture images to one side surface of a polygon model corresponding to the specific building, and provide the at least one route guide device with the 3D map information including polygon models including at least one side surface to which the building texture has been mapped.

In one embodiment, the cloud server includes a Digital Twin as a Service (DTaaS) server configured to provide digital twin map information including polygon models corresponding to respective buildings included in a map area and generated according to floor coordinates and height of the buildings, and update the digital twin map information by mapping the building texture synthesized from the plurality of texture images on the one side surface of the polygon model corresponding to the specific building; and a Mixed Reality Automotive Meta Service (MR AMS) server configured to perform communication connection with at least one route guide device, provide a texture image collected from the at least one route guide device to the DTaaS server, and provide the updated digital twin map information provided from the DTaaS server to the at least one route guide device as the 3D map information.

In one embodiment, the cloud server provides the updated digital twin map information for a predetermined area to the route guide device based on location information of the vehicle provided from the route guide device, and the location of the vehicle is a current location of the vehicle or an expected location of the vehicle estimated based on a driving route, driving speed, and the current location of the vehicle.

In one embodiment, the cloud server changes a location of the predetermined area according to a change of the location of the vehicle in response to driving of the vehicle, updates the digital twin map information according to the changed location of the predetermined area, and provides the updated digital twin map information to the route guide device in real time, and the route guide device displays MR information related to the updated digital twin map information provided in real time, so as to display the polygon models reflecting building textures according to the location of the vehicle that is traveling.

In one embodiment, when the building texture is mapped to one side surface of a specific polygon model, the cloud server further detects a blank surface to which the building texture has not been mapped among other side surfaces of the specific polygon model, and when there is the blank surface, further maps a building texture mapped to another side surface of the specific polygon model to the detected blank surface.

In one embodiment, the cloud server decides similarity between the building texture mapped to the blank surface and the building textures mapped to the other side surfaces of the specific polygon model based on a difference between an average RGB value for pixels of the blank surface with the building texture mapped thereto and an overall average RGB value for all pixels of the side surfaces of the specific polygon model, and removes the building texture mapped to the blank surface according to the decided similarity.

In one embodiment, when a first number of texture images corresponding to one side surface of a building corresponding to the specific polygon mode are collected, the cloud server generates a building texture corresponding to the one side surface of the building by synthesizing the collected texture images, and detects as the blank surface a side surface corresponding to a second number or less of texture images, smaller than the first number, among the respective side surfaces of the specific polygon model to which the building texture has not been mapped.

Advantageous Effects of Invention

Hereinafter, effects of a display device and a route guide system according to an embodiment of the present disclosure will be described.

First, in the present disclosure, images of respective side surfaces of a building may be acquired, textures corresponding to the side surfaces of the building may be generated based on the acquired image, and the generated textures may be synthesized on the respective side surfaces corresponding to a building modeling that is provided in a format of polygon data, thereby generating a digital twin map including a building model more similar to a real building. This can provide an advantage of providing a digital twin map having a higher similarity with the real world.

Second, in the present disclosure, textures corresponding to side surfaces of a building may be generated through a cloud server based on images corresponding to the side surfaces of the building photographed in a plurality of vehicles, respectively. Therefore, more accurate textures of respective side surfaces of a building can be synthesized according to images of the side surfaces photographed in various directions and at various angles. This can achieve an advantage of providing a digital twin map that increases a matching rate with the real world as textures are collected.

Third, the present disclosure may provide a new MR navigation service that can provide a route guidance service in mixed reality through a digital twin three-dimensional map in collaboration between a server and a vehicle.

BRIEF DESCRIPTION OF DRAWINGS

FIG. 12 is a flowchart illustrating an operation process of generating a building texture corresponding to a specific side surface of the building from an image obtained by a camera during the operation process of FIG. 11.

FIG. 14 is an exemplary diagram illustrating an example of extracting an image of a building around a vehicle detected according to a 3D map matched through a point cloud and an image of a specific surface of the detected building.

FIG. 15 is an exemplary diagram illustrating an example of generating a building texture corresponding to a specific surface of the building from an image of one area extracted from a camera image.

FIG. 17 is an exemplary diagram illustrating an example in which a cloud server generates a building model including collected building textures during the operation process of FIG. 16.

FIG. 18 is an exemplary view illustrating a typical example of a mixed reality-based route guidance service that is typically provided through a digital twin map using polygon data.

FIG. 19 is an exemplary diagram illustrating an example of a mixed reality-based route guidance service provided through a digital twin map including a building model in which building textures are reflected in accordance with an embodiment of the present disclosure.

MODE FOR THE INVENTION

Description will now be given in detail according to one or more embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an embodiment of the present disclosure may be understood as a conception including cars, motorcycles and the like. Hereinafter, the vehicle will be described based on a car.

The vehicle according to the embodiment of the present disclosure may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

Figure 1:
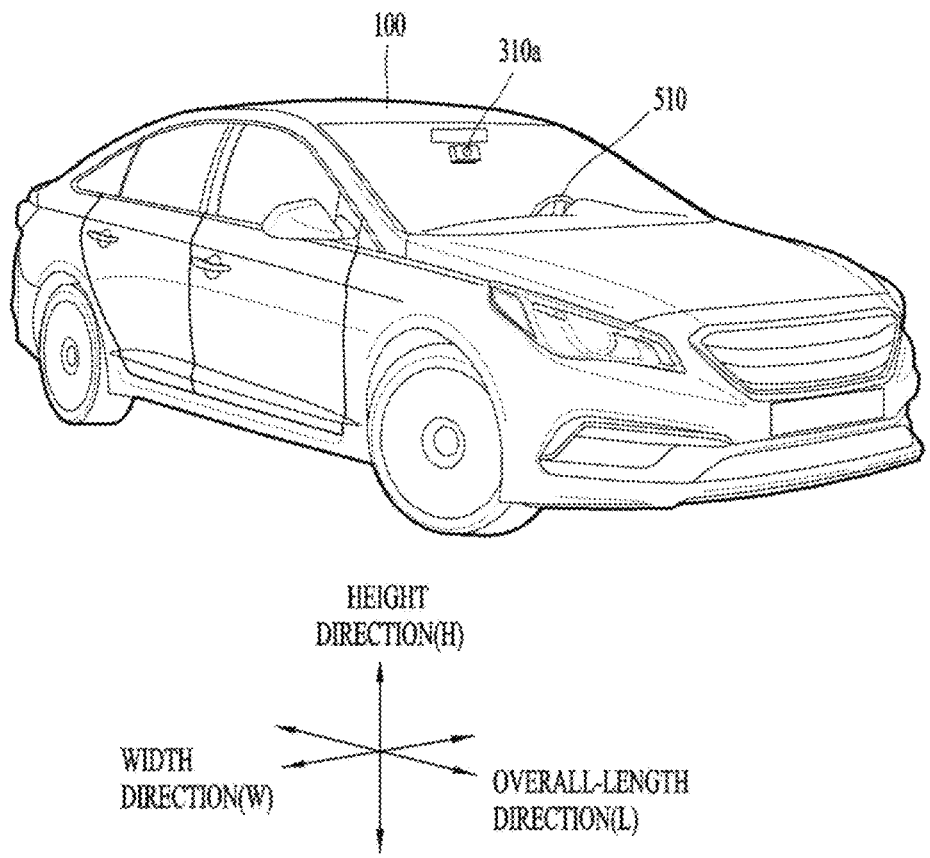
FIG. 1 is a view illustrating appearance of a vehicle in accordance with an embodiment of the present disclosure.

FIG. 1 is a view illustrating appearance of a vehicle in accordance with an embodiment of the present disclosure.

Figure 2:
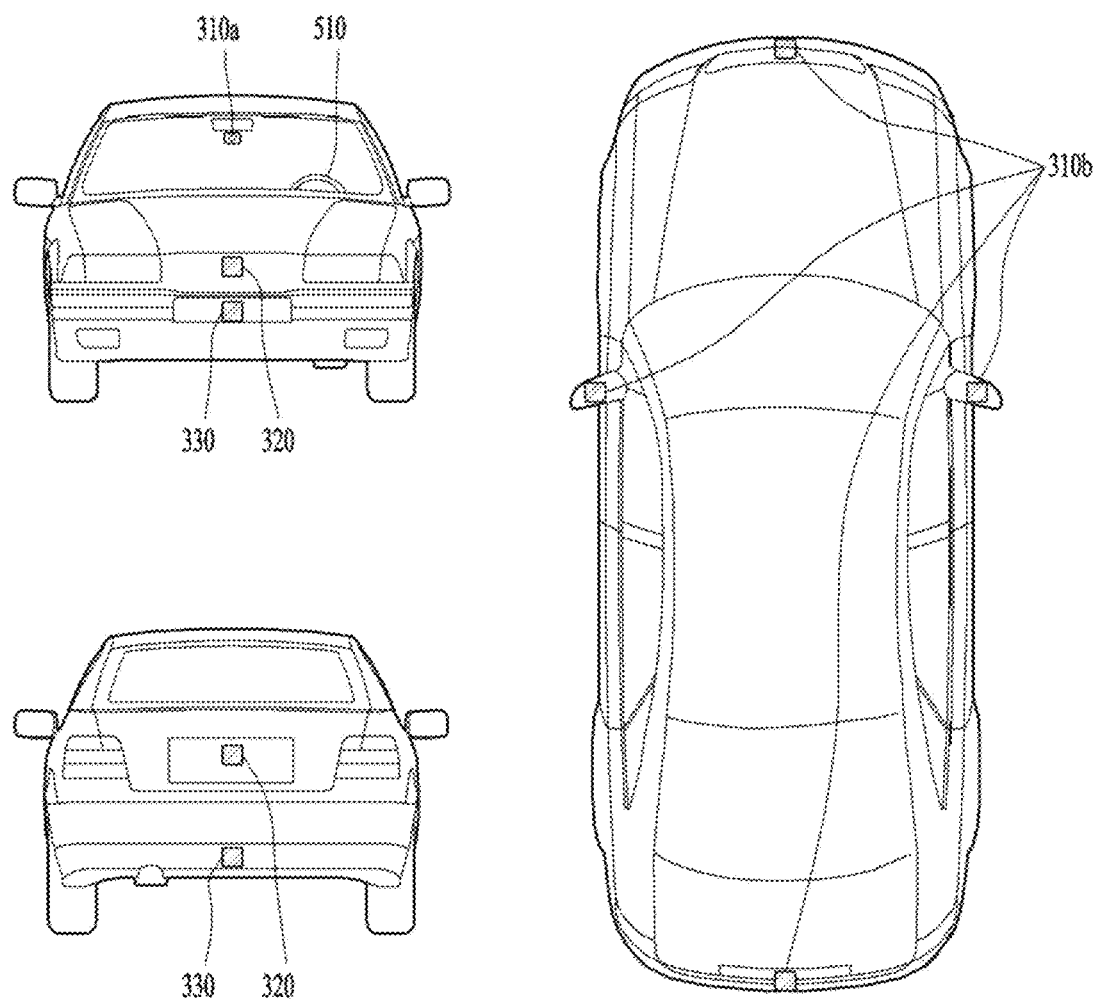
FIG. 2 is a diagram illustrating appearance of a vehicle at various angles in accordance with an embodiment of the present disclosure.

FIG. 2 is a diagram illustrating appearance of a vehicle at various angles in accordance with an embodiment of the present disclosure.

Figure 3:
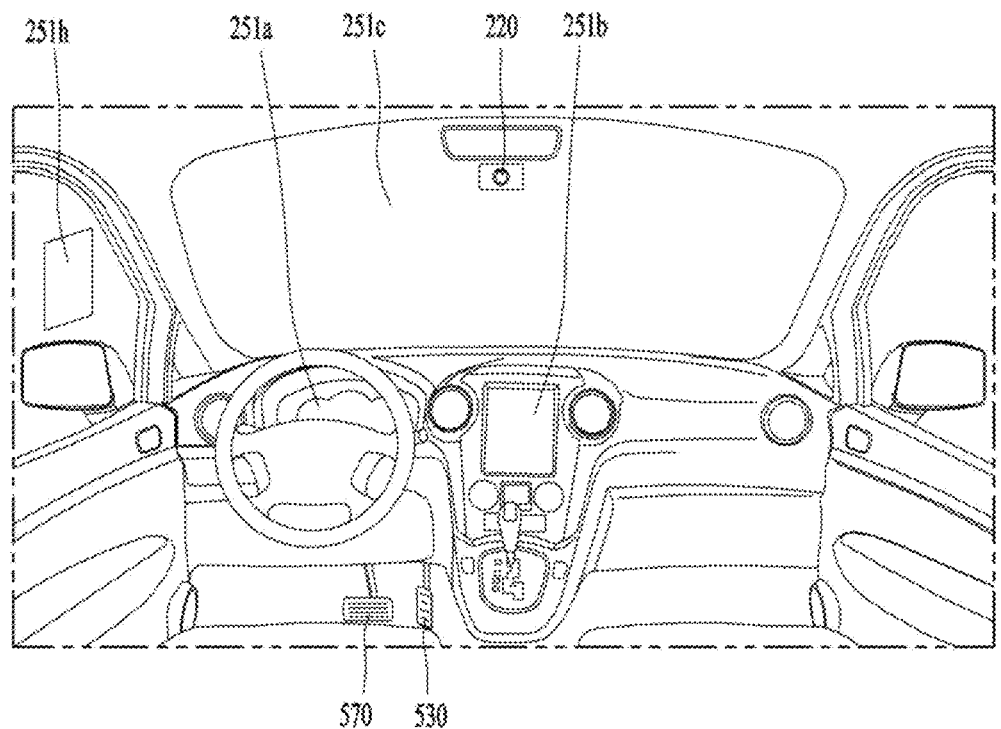
FIGS. 3 and 4 are diagrams illustrating an inside of a vehicle in accordance with an embodiment of the present disclosure.
Figure 4:
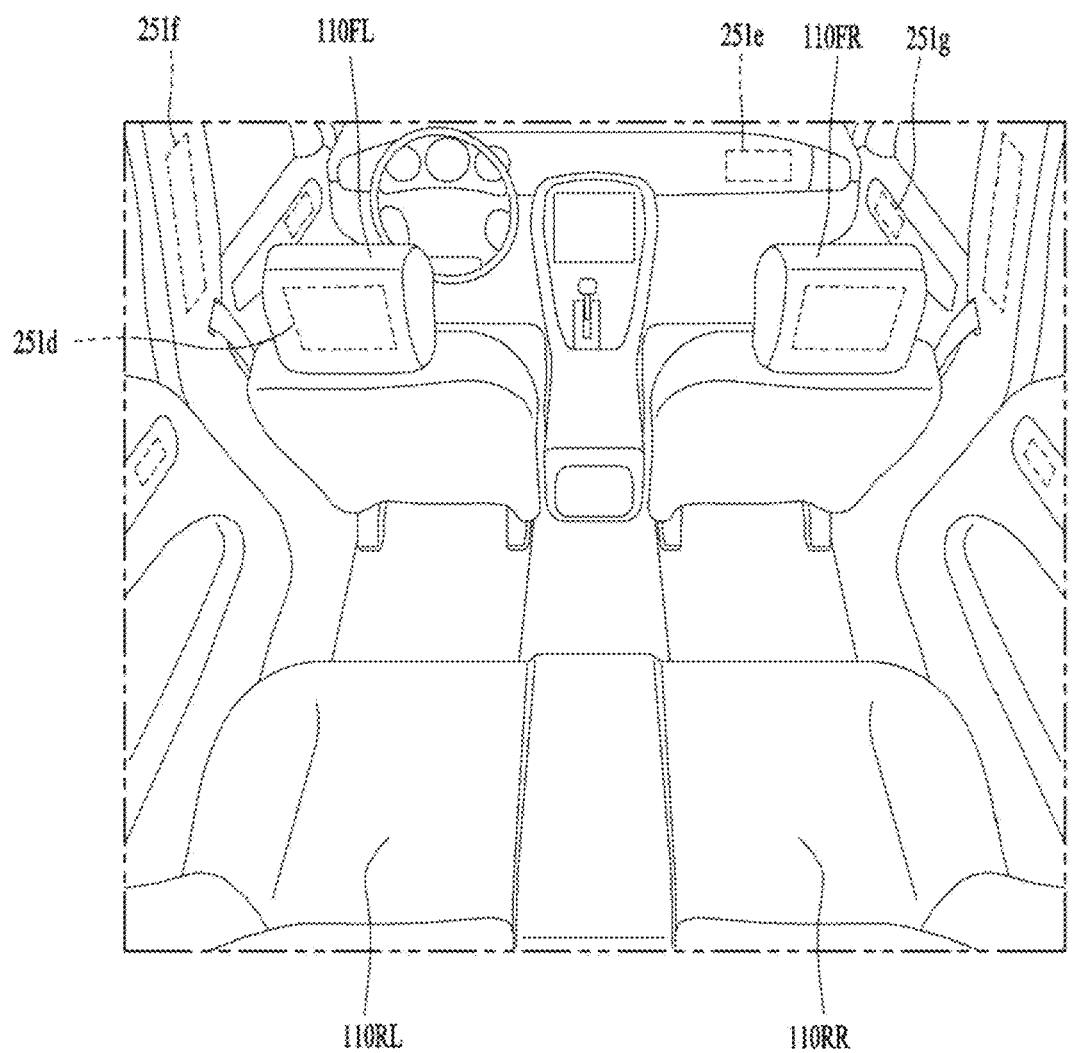

FIGS. 3 and 4 are diagrams illustrating an inside of the vehicle in accordance with the embodiment.

Figure 5:
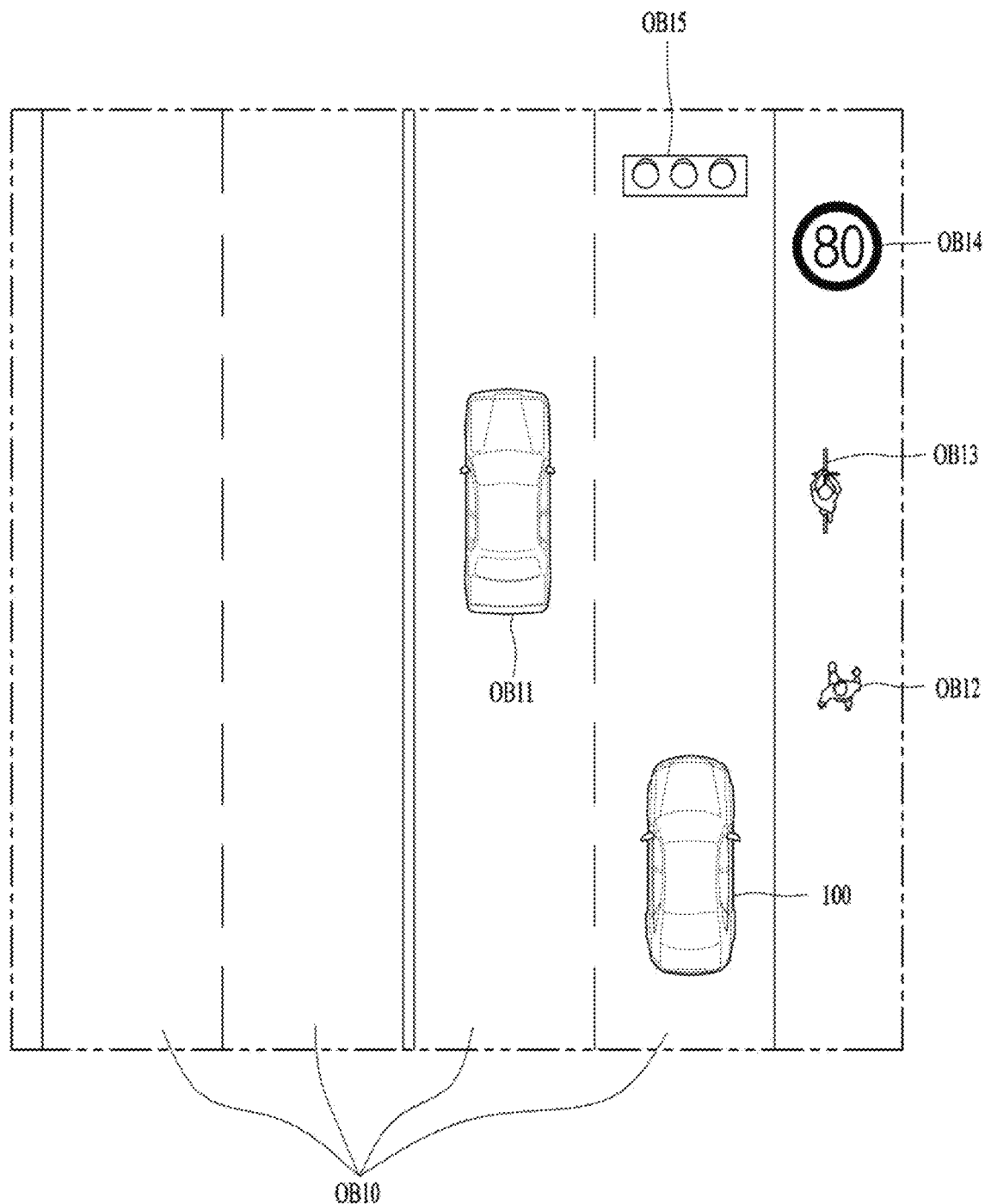
FIGS. 5 and 6 are diagrams illustrating objects in accordance with an embodiment of the present disclosure.
Figure 6:
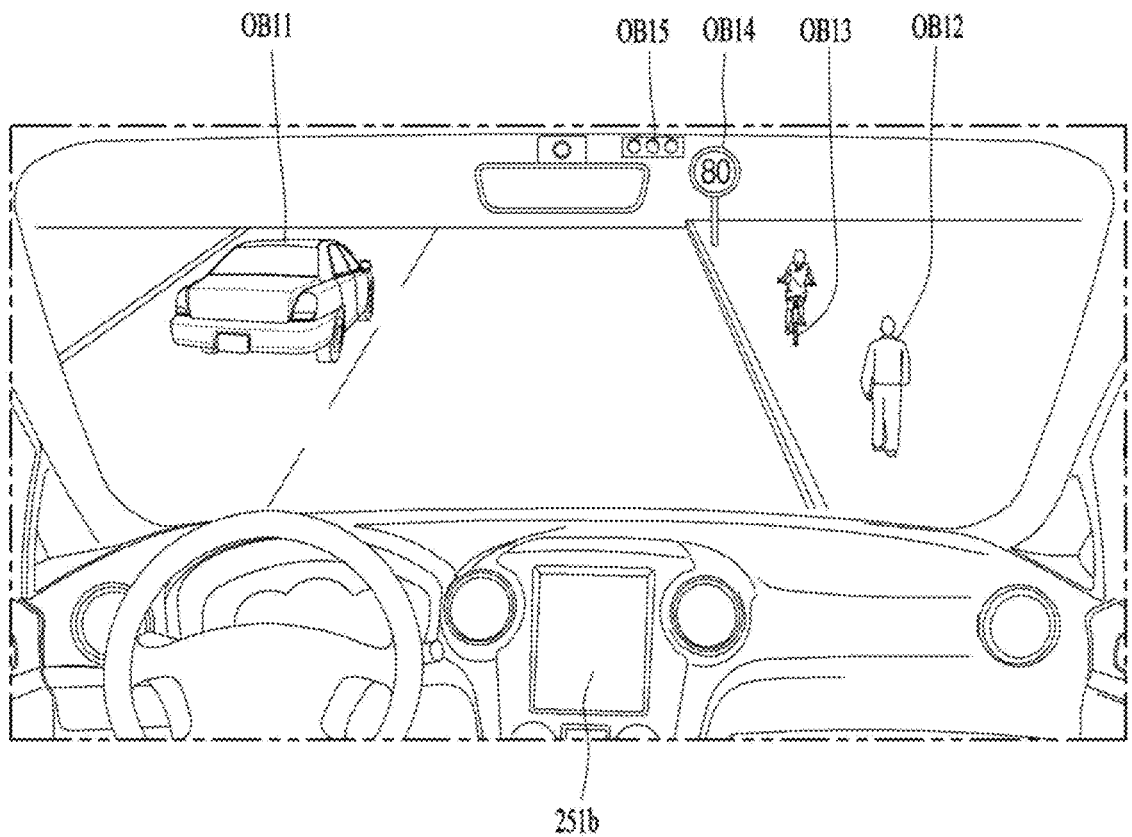

FIGS. 5 and 6 are diagrams illustrating objects in accordance with an embodiment of the present disclosure.

Figure 7:
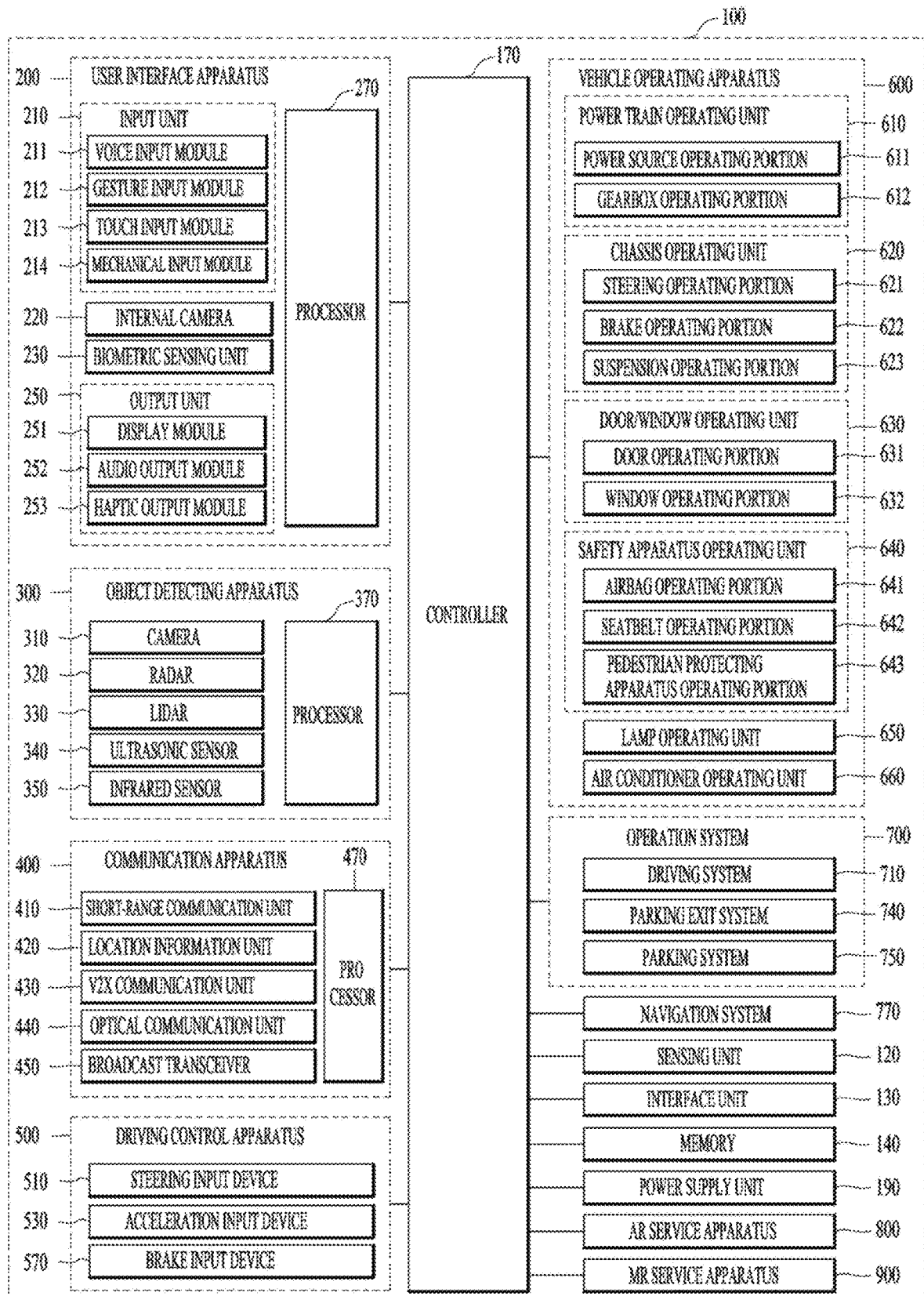
FIG. 7 is a block diagram referred for explaining a vehicle according to an embodiment.

FIG. 7 is a block diagram illustrating a vehicle in accordance with an embodiment of the present disclosure.

As illustrated in FIGS. 1 to 7, a vehicle 100 may include wheels turning by a driving force, and a steering apparatus 510 for adjusting a driving (ongoing, moving) direction of the vehicle 100.

The vehicle 100 may be an autonomous vehicle.

The vehicle 100 may be switched into an autonomous mode or a manual mode based on a user input.

For example, the vehicle may be switched from the manual mode into the autonomous mode or from the autonomous mode into the manual mode based on a user input received through a user interface device 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous mode into the manual mode based on driving environment information generated in the object detecting apparatus 300.

In an example, the vehicle 100 may be switched from the manual mode into the autonomous mode or from the autonomous mode into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signals generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 100 may implement user interfaces (UIs) or user experiences (UXs) through the user interface apparatus 200.

The user interface apparatus 200 may include an input unit 210, an internal camera 220, a biometric sensing unit 230, an output unit 250 and at least one processor, such as processor 270.

According to embodiments, the user interface apparatus 200 may include more components in addition to components to be explained in this specification or may not include some of those components to be explained in this specification.

The input unit 200 may allow the user to input information. Data collected in the input unit 120 may be analyzed by the processor 270 and processed as a user's control command.

The input unit 200 may be disposed inside the vehicle. For example, the input unit 200 may be disposed on one region of a steering wheel, one region of an instrument panel, one region of a seat, one region of each pillar, one region of a door, one region of a center console, one region of a headlining, one region of a sun visor, one region of a windshield, one region of a window, or the like.

The input unit 200 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The audio input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to embodiments, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an embodiment, the touch input module 213 may be integrated with the display module 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing unit 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display, and a transparent LED display. The transparent display may have adjustable transparency.

Meanwhile, the user interface apparatus 200 may include a plurality of display modules 251*a* to 251*g*.

The display module 251 may be disposed on one area of a steering wheel, one area 521*a*, 251*b*, 251*e* of an instrument panel, one area 251*d* of a seat, one area 251*f* of each pillar, one area 251*g* of a door, one area of a center console, one area of a headlining or one area of a sun visor, or implemented on one area 251*c* of a windshield or one area 251*h* of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a terrain, an animal and the like.

The lane OB10 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB12 may refer to a vehicle (transportation facility) that is located near the vehicle 100 and moves using two wheels. The two-wheeled vehicle OB12 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The terrain may include a mountain, a hill, and the like.

Meanwhile, objects may be classified into a moving object and a fixed object. For example, the moving object may be a concept including another vehicle and a pedestrian.

The fixed object may be a concept including a traffic signal, a road and a structure, for example.

The object detecting apparatus 300 may include a camera 310, a radar 320, a LiDAR 330, an ultrasonic sensor 340, an infrared sensor 350 and at least one processor, such as the processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender, or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor 370 may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detection device 300, the object detection device 300 may operate according to the control of a processor of an apparatus within the vehicle 100 or the controller 170.

The object detecting apparatus 400 may operate according to the control of the controller 170.

The communication apparatus 400 is an apparatus for performing communication with an external device. Here, the external device may be another vehicle, a mobile terminal, or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications may include Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include an optical transmission part for converting an electric signal into an optical signal and transmitting the optical signal to the outside, and an optical reception part for converting the received optical signal into the electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal, and a data broadcast signal.

The processor 470 may control an overall operation of each unit of the communication device 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some embodiments, the steering input device may also be configured in a shape of a touch screen, a touch pad, or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. In some implementations, the acceleration input device or the brake input device may also be configured in a shape of a touch screen, a touch pad, or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to an embodiment, the communication apparatus 600 may further include other components in addition to the components described, or may not include some of the components described.

In some examples, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque, and the like of the motor according to the control of the controller 170.

The gearbox operating portion 612 may perform a control fora gearbox.

The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protection apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protection apparatus operating portion 643 may perform an electronic control for a hood lift and a pedestrian airbag. For example, the pedestrian protection apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operation device 600 may include a processor. Each unit of the vehicle operation device 600 may individually include a processor.

The vehicle operating apparatus 600 may operate according to the control of the controller 170.

The operation system 700 is a system that controls various driving modes of the vehicle 100. The operation system 700 may operate in an autonomous driving mode.

The operation system 700 may include a driving system 710, a parking exit system 740 and a parking system 750.

According to an embodiment, the communication apparatus 700 may further include other components in addition to the components described, or may not include some of the components described.

Meanwhile, the operation system 700 may include a processor. Each unit of the operation system 700 may individually include at least one processor.

In some implementations, the operation system may be implemented by the controller 170 when it is implemented in a software configuration.

Meanwhile, according to embodiment, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The driving system 740 may receive navigation information from a navigation system 770, transmit a control signal to the vehicle operating apparatus 600, and perform driving of the vehicle 100.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The driving system 750 may receive navigation information from a navigation system 770, transmit a control signal to the vehicle operating apparatus 600, and perform driving of the vehicle 100.

The parking system 750 may receive object information from the object detecting apparatus 300, transmit a control signal to the vehicle operating apparatus 600 and park the vehicle 100.

The parking system 750 may receive a signal from an external device through the communication device 400, transmit a control signal to the vehicle operation device 600, and park the vehicle 100.

The navigation system 770 may provide navigation information. The navigation information may include at least one of map information, information regarding a set destination, route information according to the set destination, information regarding various objects on a path, lane information and current location information of the vehicle.

The navigation system 770 may include a memory and a processor. The memory may store the navigation information. The processor may control an operation of the navigation system 770.

According to embodiments, the navigation system 770 may update prestored information by receiving information from an external device through the communication apparatus 400.

According to embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a pose, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an airflow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

In some examples, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive, and the like in a hardware configuration. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Figure 8A:
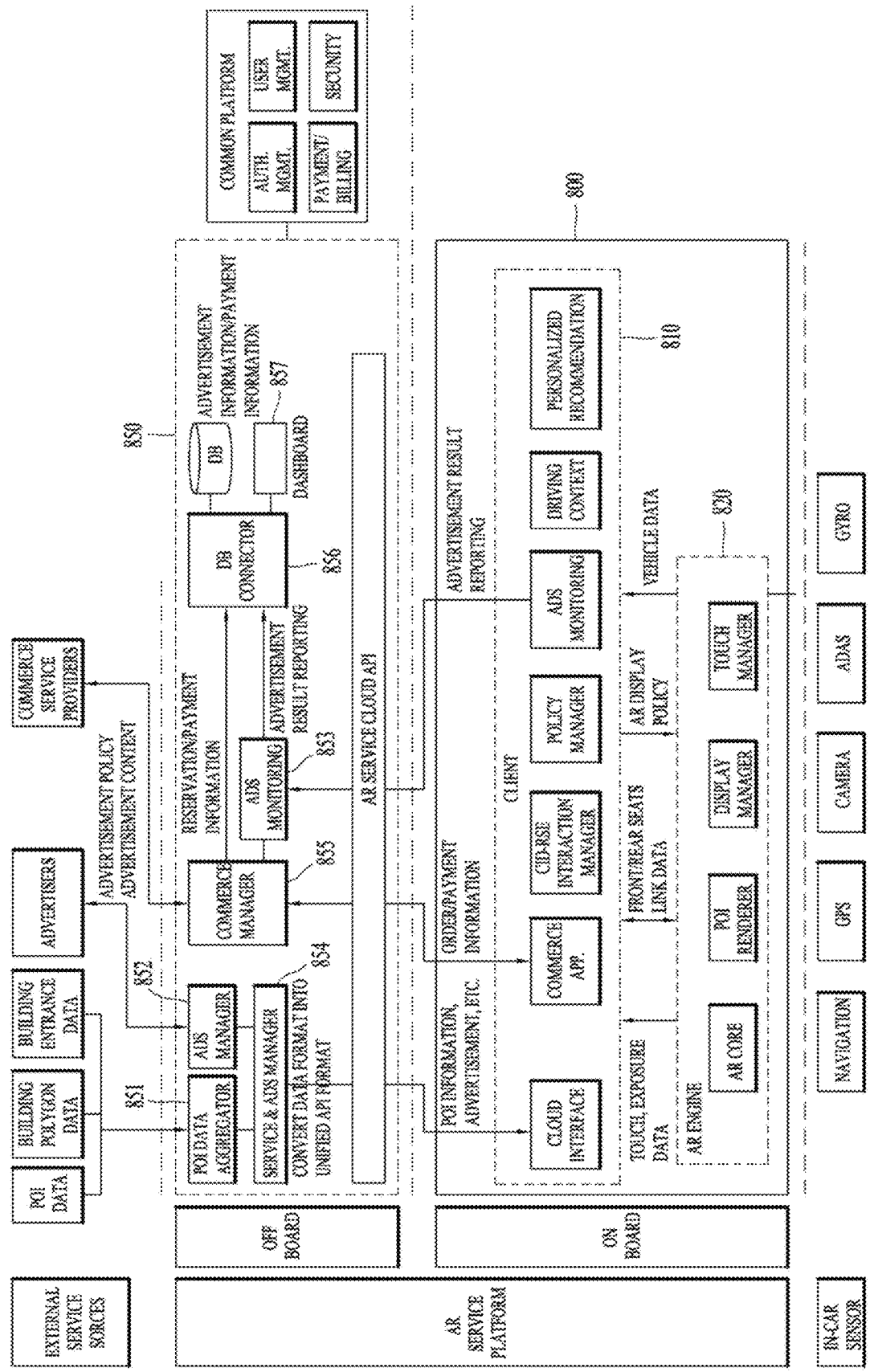
FIG. 8A is a conceptual view illustrating an AR service platform according to the present disclosure.

FIG. 8A is a conceptual view illustrating an AR service platform according to the present disclosure.

An AR service platform providing an AR service according to the present disclosure may be referred to as an AR service system.

The AR service platform may include a server 850 that is disposed outside a vehicle, collects and processes information necessary for an AR service, and transmits the information to the vehicle, and an AR service device 800 that is disposed inside the vehicle and provides the AR service using the information transmitted from the server 850.

The configuration that the server 850 collects and processes information necessary for the AR service and transmits the information to the vehicle may include the meaning that the server 850 collects and processes the information necessary for the AR service and transmits the information to the AR service device 800 disposed in the vehicle.

The AR service device 800 may vary information provided through the AR service, based on a situation of the vehicle.

That is, the AR service device 800 according to the present disclosure may dynamically adjust (vary) information and an amount of information to be displayed in AR according to a situation of the vehicle, and select information to be emphasized.

In addition, the AR service platform according to the present disclosure may control an AR service provided in the vehicle to be varied depending on specific conditions such as a situation of the vehicle, an advertisement exposure condition, and the like.

In the case of the related art AR navigation, when displaying a destination or a major POI (Point of Interest) in the AR navigation, it is difficult to reflect the latest information because of using information stored in map data, and there is a limitation that POI, such as fueling/parking, including real-time properties is not provided.

On the other hand, the AR service platform according to the present disclosure may converge location information of a vehicle, map information, a plurality of sensor data, real-time POI information, advertisement/event information, and the like, and display the converged information on an AR navigation.

For example, in order to display AR information, the AR service device 800 according to the present disclosure may receive AR service information from the server based on a current location of the vehicle and navigation route/guide information, and process the AR service information into a form to be displayed on an AR navigation screen.

In one example, the AR service device 800 according to the present disclosure may reconstruct real-time AR display information. The AR service device 800 may reconstruct service data received from a server to be displayed on an AR navigation screen by determining a display format, size, location, exposure method, etc. of an AR content in consideration of a driving situation (e.g., varying an exposure position and size of POI according to driving speed, changing an exposure position of service information according to traffic conditions, adjusting a display position and exposure time of an AR wall, etc.)

In addition, the AR service device 800 according to the present disclosure may analyze exposure frequency of AR display information through user feedback.

The server 850 may perform a content exposure frequency analysis by collecting user input information (input information such as touch, order, etc.) for an AR service content, and adjust a service content exposure policy based on the information.

Through this configuration, the present disclosure can converge various external service contents to be expressed in the AR navigation, and can provide various services through POI information including real-time properties.

In addition, various types of AR contents such as advertisements, events, and major landmark information as well as POI information can be displayed.

In addition, a new user experience of AR navigation can be presented through a UX scenario-based embodiment proposed in the present disclosure.

The present disclosure provides a service platform structure and AR information display method (UX) that dynamically adjust an amount of information (POI data, advertisements) to be displayed in AR according to a vehicle situation and an advertisement exposure condition, a module that collects POI information and commerce service information for AR expression and processes the collected information into a format to be easily rendered in an AR engine, a module that emphasize specific POI information according to an internal/external situation of the vehicle, a module that collects vehicle situation information and applies a UX policy appropriately to the situation, and an AR engine module that renders an AR object (group Poi, mini Poi, 3D object, event wall, etc.) according to the UX policy.

The present disclosure may provide a client module that performs interaction and data transmission/reception between displays of front and rear seats of a vehicle, a service App module that exposes commerce service information associated with POI, a client module that collects user actions on advertisements, such as exposure results, clicks, and the like for AR advertisement objects, and a cloud module that collects/analyzes the user actions on the advertisements, such as the exposure results, clicks, and the like for the AR advertisement objects.

Referring to FIG. 8A, the AR service platform of the present disclosure may include a server 850, which is a component (off-board component) existing outside the vehicle, and an AR service device 800, which is a component (on-board component) disposed inside the vehicle.

First, the server 850 may include a POI data aggregator 851, an advertisement manager (Ads Manager) 852, an advertisement monitoring unit (Ads Monitoring) 853, a service and advertisement manager (Service & Ads manager) 854, a commerce manager 855, a DB connector 856, and a dashboard 857.

The POI data aggregator 851 may receive information necessary for an AR service from a plurality of external servers and convert/integrate the received information into a message format of the AR service platform.

The advertisement manager 852 may perform advertisement information/content management and advertisement campaign (advertisement exposure condition) management.

The advertisement monitoring unit 853 may collect/store advertisement exposure and click results.

The service and advertisement manager 854 may insert advertisement information suitable for an exposure condition into service information to provide to a client.

The commerce manager 855 may collect commerce service interaction/payment information.

The DB connector 856 may store/query advertisement contents, advertisement exposure result information, and commerce payment information.

The dashboard 857 may display a real-time AR service status by visualizing advertisement exposure results/payment details.

In addition, the server 850 may further include an AR service cloud API (or data conversion unit) that converts information transmitted from the AR service device 800 of the vehicle into a data format to be usable in the server, and converts information processed/generated in the server into a data format to be usable in the AR service device 800.

Meanwhile, the AR service device 800 may include a client 810 that includes a cloud interface, a commerce App, a CID-RSE interaction manager, a policy manager, advertisement monitoring, driving context, and personalized recommendation, etc., and an AR engine 820 that includes a POI renderer, a display manager, a touch manager, etc.

The client 810 may receive POI information, advertisements, and the like from the server.

In addition, the client 810 may transmit/receive order/payment information with the server 850 and transmit an advertisement exposure result to the server 850.

The AR engine 820 may transmit to the client 810 data such as the number of touches and the number of exposures with respect to an AR object which is output in AR.

The AR engine 820 may also transmit/receive front/rear seats (CID-RSE) interoperation data with the client 810, and output an AR object according to an AR display policy received from the client 810.

In addition, the AR engine 820 may determine a type of an AR object, an output position of the AR object, a type of POI, an output size of the POI, etc. provided through an AR service on the basis of data collected from a gyro sensor, a camera, a communication unit, a navigation, an Advanced Driver Assistance System (ADAS), a GPS, etc.

The on-board AR service device 800 may perform AR rendering of service contents so that data received from the cloud server is displayed in AR on a front camera image.

In addition, the AR service device 800 may mediate data transmission between the server and the AR engine, such as collecting advertisement posting result data from the AR engine and transmitting the collected data to the server.

The AR service device 800 may also perform CID-RSE (i.e., front/rear seats) interoperation data generated in AR.

The AR service device 800 may perform data management for AR display policies, and specifically, may provide AR display policy data according to a driving situation to the AR engine.

The AR service device 800 may provide situation awareness and personalized service, and specifically, may provide an AR object to the AR engine according to a driving situation (speed, turn-by-turn (TBT), etc.) using in-vehicle data.

In the present disclosure, a description will be given of an example of providing an AR service by outputting AR information (or AR object, AR content, POI information, etc.) to be overlaid on an image captured (received, processed) by a camera disposed in a vehicle.

However, it is not limited thereto, and may be equally/similarly applied to various methods of implementing augmented reality, such as outputting AR information directly on a windshield of a vehicle to overlap a space of the real world, or outputting AR information through a head-up display (HUD), on a driver or passenger basis.

Input data (input information) used to provide the AR service and output data (output information) provided through the AR service platform are as follows.

First, types of input data may include map information (navigation information), service content information (POI, advertisement, etc.), dynamic information, vehicle sensor information, historical information, and driving-related information.

The map information (navigation information) may include route information (navigation route) to a destination, guidance information (Turn-by-Turn), a shape of road ahead (road/lane), and a plurality of map attribute information (road type/attribute, width, curvature, slope, speed limit, etc. of road and lane, and the like), localization object information (road marking, traffic sign, etc.), and the like.

The service content information (POI, advertisement, etc.) may include POI information received from a plurality of service providers, advertisement information that can be received at a current location, and real-time information for reservation/payment services of gas stations, charging stations, parking lots, and the like.

The dynamic information may include traffic information (road-unit traffic, lane-unit traffic), event information (accident, hazard warning, etc.), weather information, V2X (V2V, V2I), etc.

The vehicle sensor information may include current location information (GPS/DR), camera input information (ADAS information, object recognition information), and V2X (real-time surrounding information that can be collected through V2V and V2I).

The historical information may include information related to past driving routes, traffic history (e.g., traffic per time zone), communication rate according to zone and time, and the like.

The driving-related information may include a driving mode (manual, autonomous driving, semi-autonomous driving, whether an ADAS function has been operated, etc.), whether a destination or via-point has entered, whether to enter a parking lot, and the like.

Output information that may be provided through the AR service platform may include current location/route-based AR service display data.

The current location/route-based AR service display data may include information related to a point (location where an advertisement can be displayed in AR on a route (highlighting AR Wall, POI building), selectable AR building information (selectable main building information such as landmarks), general POI information (POI summary information such as icons or speech bubbles), remote POI information (displaying distance/direction of important POI information that does not exist on the route but is helpful for driving), display information output when multiple POIs exist in the same building, information related to a destination building and a real-time parking lot status, real-time status information of gas stations/charging stations, location-based advertisement/event information, and the like.

The AR service platform according to the present disclosure may filter AR service information according to real-time information and determine a display method.

Specifically, the AR service platform may determine the number of POIs to be exposed in real time based on driving speed, POI overlap removal, size adjustment, exposure time, and the like.

In addition, the AR service platform may determine a POI exposure method according to risk information recognition, and specifically, may dynamically change a POI display method depending on an accident, construction, a situation of recognizing a plurality of moving objects, and the like.

The AR service platform may dynamically change a POI display position upon an occurrence of a situation in which AR display visibility is deteriorated due to traffic.

The AR service platform may reconstruct front/rear-seat (CID-RSE) AR display data. For example, the AR service platform may reconstruct the CID-RSE AR display data such that AR service information is minimized on the front-seat display and all information to be displayed is displayed on the rear-seat display.

The operation/function/control method of the AR service platform may be implemented by the server included in the AR service platform or the AR service device, or may be implemented by an organic interaction between the server and the AR service device.

Hereinafter, a more detailed description of the configuration of the server 850 of the AR service platform will be given with reference to FIG. 8A.

The service and advertisement (service & Ads) manager 854 may perform a client request function, a function of aggregating POI information and advertisement information (data processing & aggregation), and a client response function.

Specifically, the client request function may include request/reception of POI information (location, category) from a unified application programming interface (API) or request/reception of destination entrance location information (one selected from destination coordinates/address/id) from the unified API.

Here, the unified API refers to an API (to minimize client variation) defined in an AR service cloud that is not dependent on a specific data provider.

The function of aggregating POI information and advertisement information (data processing & aggregation) may include aggregation of POI information and advertisement information within a radius of 000 m from a location requested from a client (data manager, Ads manager), or aggregation of destination entrance location and POI advertisement information requested from the client (data manager, Ads manager).

Specifically, the function of aggregating POI information and advertisement information may include a function of matching POI information with advertisement information including information regarding a building wall and an event wall, or filtering a plurality of POIs in the server according to priorities when the plurality of POIs are present in the same building (e.g., excluding other POI information except for partner companies).

Here, a filtering criterion may include assigning priorities to POIs, respectively, and comparing the priorities of the POIs.

The client response function may include transmitting POI information and advertisement information to a unified API or transmitting destination entrance location and advertisement information to the unified API.

A data manager (not shown) included in the server 850 may perform a POI information collection/forward function, a building shape (polygon) information collection/forward function, and a destination entrance information collection/forward function.

The POI information collection/forward function may include a function of requesting POI information from a third party API or forwarding (to service & Ads aggregator) the POI information received from the third party API (by converting the same into a unified API response format).

The building shape (polygon) information collection/forward function may include a function of requesting building contour information from the third party API/data set, or forwarding (to service & Ads aggregator) POI information received from the third party API (by converting the same into a unified API response format).

The destination entrance information collection/forward function may include a function of requesting destination entrance information from the third party API or forwarding (to service & Ads aggregator) the destination entrance information received from the third party API (by converting the same into a Unified API response format).

The advertisement manager 852 may provide a partner (advertisement) company management interface, an advertisement campaign management interface, and an advertisement content management interface.

The advertisement monitoring unit 853 may perform a function of receiving advertisement effect measurement feedback and a function of transmitting advertisement information.

The partner (advertisement) company management interface may perform a POI advertiser management (advertiser information addition/modification/deletion) and a general advertiser management (advertiser information addition/deletion).

A POI support advertisement format may include a brand POI pin, a building wall, 3D rendering, an event wall, etc. and a support advertisement format (general support advertisement format) of a brand advertisement (e.g., Coca-Cola advertisement, etc.) that is not involved in an actual POI/location may be an event wall.

The advertisement campaign management interface may perform addition/modification/deletion of an advertisement campaign (an advertisement location, type, time, etc.).

The advertisement content management interface may perform addition/modification/inquiry/deletion of content (POI brand icon image, building wall image, event wall image/video, 3D rendering image) for each advertisement format.

The function of receiving advertisement effect measurement feedback may include a function of receiving advertisement exposure feedback transmitted by the client and forwarding the same to a DB manager (CPC/CMP/CPT&P).

The advertisement information transmitting function may include a function of searching for and transmitting advertisement campaign information to be exposed within a radius of 000 m from a location requested by the service & Ads aggregator (in case of CPT&P, transmitting only advertisements that meet a time condition).

The commerce manager 855 may perform a client interoperating function, an external commerce service interoperating function, and a payment information management function.

The client interoperating function may include a function of receiving a request by interoperation with the client through the unified API, converting the request received through the unified API into an external commerce API specification, converting data received from an external API into a message format of the unified API, and forwarding the data to the client.

The commerce manager may convert the request received through the unified API into the external commerce API specification and perform an external service interoperating function based on the converted result.

Converting the data received from the external API into the message format of the unified API may mean a task of converting data received through the external service interoperation into the format of the unified API.

The external commerce service interoperating function may be configured to perform request and result reception for a list of stores adjacent to a current location and meta information thereof, request and result reception for detailed information regarding a specific store from the list, request and result reception for reservations/orders, request and result reception for a service usage status, and link (interoperation) and result reception for membership information of a commerce service.

Here, the request and result reception for the service usage status may be used for sequence management and AR message pop-up according to the service use status (completion of reservation/entering a parking lot/parking in progress/leaving a parking lot/cancellation of reservation).

The link and result reception for membership information of the commerce service may be used for linking information between commerce service members↔AR service members (OEM connected service members).

The payment information management function may include a function of collecting payment details (content, amount) for an external commerce service and charging a fee to an external commerce company based on the payment details.

The database (DB) connector 856 may perform an advertisement effect measurement data management function, a commerce data management function, an advertiser data management function, an advertisement content data management function, and an advertisement location data management function.

The advertisement effect measurement data management function may save/delete log data related to CPC/CPM/CPT&P and perform data search (by POI, by brand, by time, by advertisement type).

The commerce data management function may save/delete payment details (contents, amount) made in an external commerce service and perform data search (by POI, by brand, by time, by advertisement type).

The advertiser data management function may perform storage/modification/deletion/inquiry of advertiser information and advertisement campaign settings for each advertiser.

The advertisement content data management function may store/modify/delete/retrieve advertisement contents in association with advertiser information.

The advertisement location data management function may manage event wall section coordinates and building wall coordinates (by brand) for displaying AR advertisements, and may divide such coordinates into coordinates registered by the user and specific coordinates obtained through interoperation with an API of a company/

The dashboard (service dashboard) 857 may perform an advertisement effect measurement data visualization function and a commerce service data visualization function.

The advertisement effect measurement data visualization function may provide CPC: a chart for total clicks on advertisement by company/brand (checkable by period), CPC: an aggregate chart for total clicks on advertisement (checkable by period), CPM: a chart for total advertisement impressions by company/brand (checkable by period), CPM: an aggregate chart for total advertisement impressions (checkable by period), CPT&P: a chart for clicks on advertisement by company/brand (checkable by period), and CPT&P: a chart for advertisement impressions by company/brand (checkable by period).

Such charts may be provided in various ways, such as bar graphs, line graphs, pie charts, word graphs, or geospatial graphs.

CPT&P refers to billing per time other than the number of clicks or impressions, but may be used as data to measure an exposure effect.

The commerce service data visualization function may provide a chart for a cumulative amount of payments by company (checkable by period) and a chart for a total cumulative amount of payments (checkable by period).

Figure 8B:
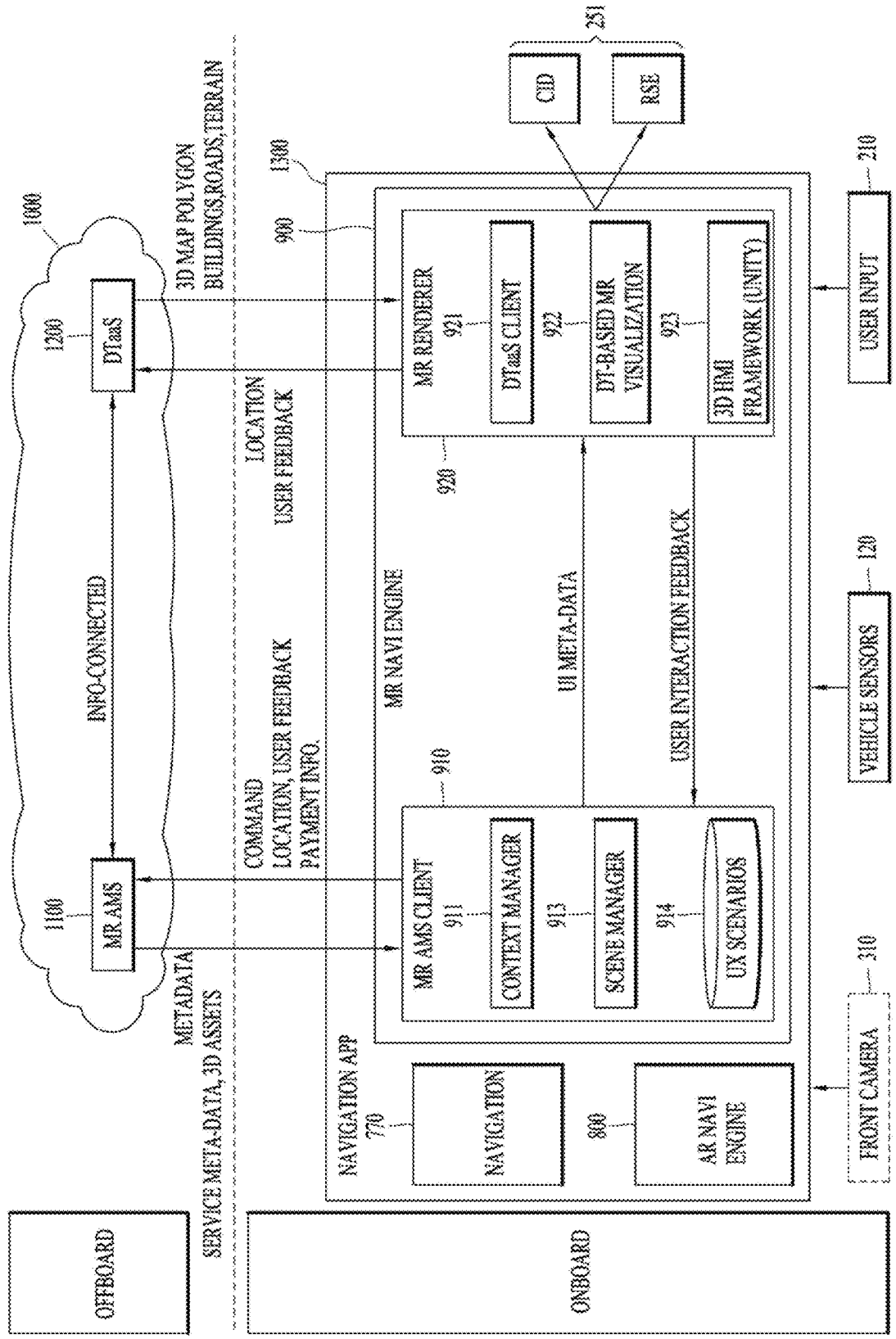
FIG. 8B is a conceptual view illustrating an MR service platform for providing an MR service according to the present disclosure.

FIG. 8B is a conceptual view illustrating an MR service platform for providing an MR service according to the present disclosure.

The present disclosure may provide a mixed reality (MR) service platform capable of providing an MR automotive metal service (MR AMS) (hereinafter, also referred to as an MR service).

The MR service platform may be referred to as an MR service system, an MR navigation system, an MR platform, an MR system, and the like.

An MR service platform refers to a platform capable of providing services based on mixed reality, and may include several independent components.

For example, the MR service platform may include an MR service device 900 (or referred to as an MR navigation engine) which is on board the vehicle, an MR AMS (hereinafter, referred to as an MR AMS server) server 1100 and a digital twin as a service (DTaaS) server 1200 which are disposed on an external server end (or cloud end) off-board the vehicle.

The MR service device 900 may include an MR AMS client 910 and an MR renderer 920.

The MR service described herein may be understood as an MR navigation service for a vehicle. That is, the MR service platform of the present disclosure may provide a vehicle interface implemented in mixed reality to a user on board the vehicle.

The MR service provided by the MR service platform of the present disclosure may provide an experience of a digital world through a display disposed in the vehicle even though the user is driving the vehicle in the real world.

Specifically, the MR service may interactively provide a driver with a user experience for route guidance, safe driving, POI (Point of Interest), and entertainment in a virtual 3D space in which real world information is converged with a digital world.

Through this, the MR service platform of the present disclosure may provide various user experiences (UXs) that are free from space-time constraints compared to the existing camera-based (or head-up display (HUD)-based) augmented reality (AR).

Here, the digital world means a digital twin or a digital twin smart city, and the real world information may include infrastructure data such as Vehicle to Everything (V2X) and Cooperative-Intelligent transport Systems (C-ITS), and/or surrounding data perceived through sensors disposed in an autonomous vehicle.

In addition, the convergence described above may include a conception of converging sensor data of vehicles and infrastructures, in addition to the MR service cloud 1000 (or MR AMS cloud) and the MR service device 900, to implement the MR service platform according to the present disclosure.

In addition, the term "interactive" should be understood as a concept including not only mixed reality navigation, but also high-quality 3D image rendering and user interaction.

On the other hand, mixed reality (MR) described herein may mean an environment in which virtual reality is grafted to the real world and physical objects in the real world and virtual objects can interact with each other.

Mixed reality (MR) may include the meaning of augmented reality (AR) adding virtual information based on reality and augmented virtuality (AV) adding real information to a virtual environment.

In other words, by providing a smart environment where reality and virtuality are naturally connected, users can have rich experiences. For example, a user can interact with a virtual pet sitting in the user's palm or play a game by constructing a virtual game environment in a real room. It may also be possible to virtually rearrange furniture in home, or create an environment where remote people come and work together.

A mixed reality automotive meta service (MR AMS) using mixed reality (MR) according to an embodiment of the present disclosure may express a future driving route as a preview to help a user prepare for road shapes and actions in advance.

In addition, the mixed reality automotive meta service (MR AMS) using the mixed reality (MR) according to an embodiment of the present disclosure may improve advertising effects or induce service usage rate improvement by observing a specific point of interest (POI).

In addition, the mixed reality automotive meta service (MR AMS) using the mixed reality (MR) according to an embodiment of the present disclosure is not dependent on a specific map provider, and it is also possible to converge data from various map providers.

The present disclosure may provide an MR navigation function as one of the MR AMSs.

Since the MR navigation function is implemented on the virtual world rather than overlaying AR objects on the real world, it is possible to solve a problem of front occlusion or difficulty in achieving matching quality, which occurs in AR navigation.

Accordingly, the present disclosure can improve user experience (UX) by effectively expressing various contexts, which were difficult to be expressed in the existing navigation, through the MR navigation function.

To this end, the MR service platform of the present disclosure may provide an MR context management method, and a method and system for obtaining metadata and 3D assets for providing MR AMS.

The MR service platform of the present disclosure may render related service metadata and 3D assets to MR navigation by defining MR contexts required in a digital world and modeling service metadata to acquire the MR contexts.

Accordingly, the present disclosure may provide an experience of the digital world through the display disposed in the vehicle even during driving in the real world, and recommend to a user various additional human machine interface (HMI) services by utilizing improved visibility and viewability of an MR navigation.

Hereinafter, an MR service platform according to an embodiment of the present disclosure for providing the above-described MR service will be described.

Referring to FIG. 8B, the MR service platform (or MR service system) according to the present disclosure may include an MR service cloud 1000 disposed outside the vehicle and an MR service device 900 disposed inside the vehicle.

The MR service cloud 1100 disposed outside the vehicle (Offboard) may include at least one of a Mixed Reality Automotive Meta Service (MR AMS) server 1100 and a Digital Twin as a Service (DTaaS) server 1200.

The MR service device 900 disposed inside the vehicle (Onboard) may include an MR AMS client 910 and an MR renderer 920.

The MR service device 900 may provide a navigation function (or navigation application) by interoperating with the AR service device 800 and the navigation system 770.

Information required for the navigation function may be received through a user input (or user request) which is input through the camera 310, the sensing unit 120, and the user input unit 210 disposed in the vehicle.

In addition, information necessary for the navigation function may be received through the MR service cloud 1000 disposed outside the vehicle (Offboard), and information that is sensed or processed in the vehicle may also be transmitted to the MR service cloud 1000 in order to receive necessary information in each vehicle.

Figure 8C:
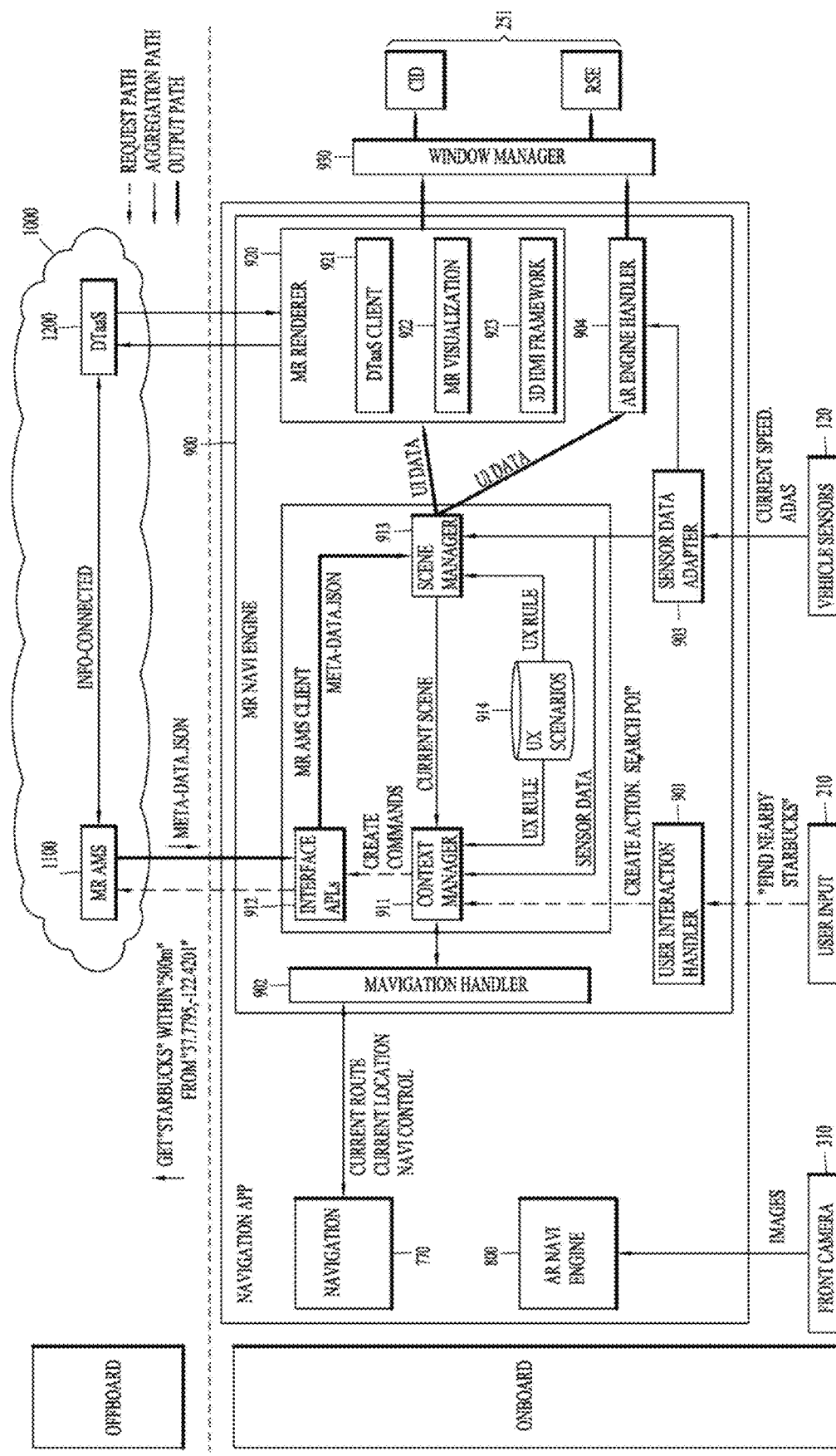
FIG. 8C is a conceptual view illustrating an MR AMS client according to the present disclosure.
Figure 8D:
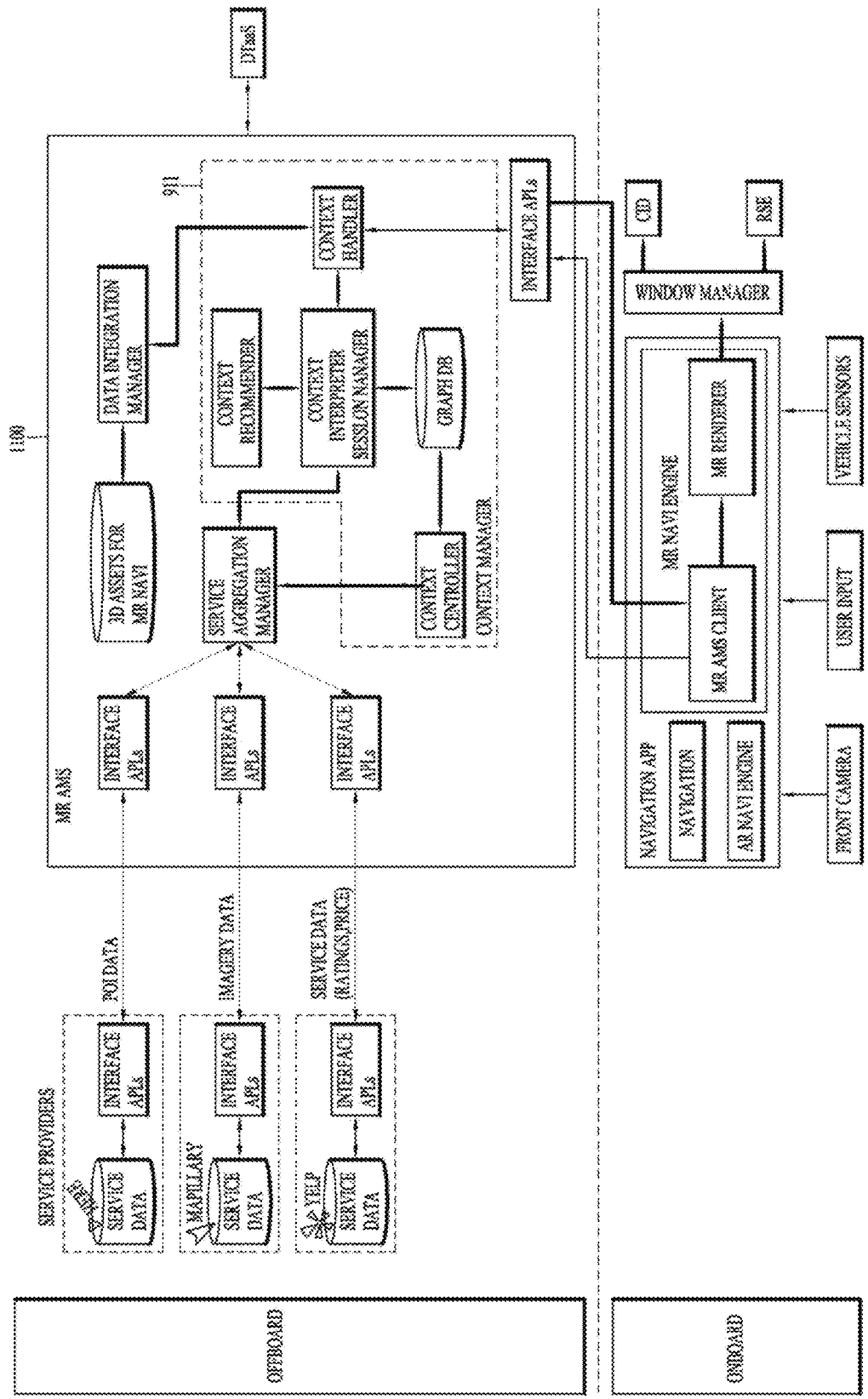
FIG. 8D is a conceptual view illustrating an MR AMS server according to the present disclosure.

The MR AMS server 1100, as shown in FIG. 8D, may be connected to various service providers 1300a, 1300b, and 1300c that provide Online map services such as Open Street Map (OSM), Mapbox, HERE, WRLD, BingMAP, etc. The MR MAS server 1100 may also aggregate shape information of each building (e.g., floor footprint information and height information of a building) which is included in a map based on results of aggregating map data provided from the connected service providers 1300a, 1300b, and 1300c, and provide the aggregated information to the DTaaS server 1200. Here, the DTaaS server 1200 may mean a server or device that provides DTaaS, that is, a service using a digital twin map.

The DTaaS may be abbreviated from Digital Twin as a Service or Digital Transformation as a Service.

Meanwhile, the DTaaS server 1200 may be connected to a POI database in which POI service data for each building or area included in map information is stored. In addition, the DTaaS server 1200 may be connected to a 3D model database in which data of a 3D polygon model (or a three-dimensional (3D) polygon map) for each building included in the map information is stored. Here, the 3D polygon model is a polygon model capable of providing a building volume, and may be a polygon model without a texture on a surface thereof. The DTaaS server 1200 may receive POI-related service data from the connected POI database, and may receive data of 3D polygon models of respective buildings included in map information regarding one area from the connected 3D model database.

A processor (not shown) of the MR service device 900 may receive various types of information related to vehicle driving from the object detecting apparatus 300, the sensing unit 120, and the navigation system 770. For example, the processor may receive information related to an object detected at the front, rear, or side of the vehicle from the camera 310 of the object detecting apparatus 300.

In addition, the processor may receive information related to vehicle speed, a driving direction of the vehicle, a current location (GPS) of the vehicle, etc. from the sensing unit 120 which includes sensors connected to each component of the vehicle including the driving system 710. The processor may also receive information related to a driving route of the vehicle from the navigation system 770.

Meanwhile, the MR service device 900 and the DTaaS server 1200 may be connected through interface APIs of the MR AMS. Here, the MR service device 900 and the interface APIs of the MR AMS may be connected through a wireless network connection. In this case, the MR AMS server 1100 may be a network server or a cloud server wirelessly connected to the MR service device 900.

In this way, when connected to the MR AMS server 1100, the MR service device 900 may provide at least some of information received from the connected components (e.g., the camera 310, the sensing unit 120, or the user input unit 210 of the vehicle) to the MR AMS server 110 through a network connection. Then, the MR AMS server 1100 may provide 3D map data for providing mixed reality to the MR service device 900, in response to the provided information.

For example, the MR service device 900 may transmit information related to objects detected around the vehicle, and speed, direction, and current location of the vehicle. Further, the MR service device 900 may provide information related to a driving route to the MR AMS server 1100. Then, the MR AMS server 1100 may provide the MR service device 900 with 3D map data of one area according to the current location of the vehicle based on the information provided by the MR service device 900.

In this case, the MR AMS server 1100 may determine POI information based on the current location of the vehicle, the speed of the vehicle, and the driving route of the vehicle, and also provide 3D map data that the determined POI information is further included in the 3D building map. In addition, the MR AMS server 1100 may provide the MR service device 900 with 3D map data, which further includes information related to situations around the vehicle, based on provided information of objects around the vehicle.

Meanwhile, the MR service device 900 may render an MR image based on the 3D map data provided from the MR AMS server 1100. For example, the MR service device 900 may control the MR renderer 920 to display a 3D map screen including models for buildings around the vehicle based on the provided 3D map data. In addition, the MR renderer 920 may display a graphic object corresponding to the vehicle on the 3D map screen, and display graphic objects corresponding to the provided POI data and situation information around the vehicle on the 3D map screen.

Therefore, an image of a virtual environment (in other words, an MR image, an MR navigation screen, or an MR navigation interface), which includes a 3D building model similar to the shape of a building adjacent to the vehicle, and a graphic object corresponding to the vehicle may be output to the display 251 disposed in the vehicle, for example, a center information display (CID), a head up display (HUD), rear sheet information (RSI), or rear sheet entertainment (RSE).

In this case, information related to driving of the vehicle and situations around the vehicle may be provided to the driver through the virtual environment. The MR service device 900 according to an embodiment of the present disclosure may provide the MR service to the driver through the 3D map information, that is, a digital twin map (hereinafter, referred to as a DT map).

Meanwhile, the MR AMS server 1100 may determine 3D map data and POI information or situation information around each vehicle to be provided together with the 3D map data, on the basis of information collected not only from the MR service device 900 disposed in one vehicle but also from the MR service devices disposed in a plurality of vehicles. In this case, the MR AMS server 1100 may collect information from a plurality of vehicles in the form of a cloud server and generate 3D map data for mixed reality based on the collected information. The MR AMS server 1100 may also be configured to provide the MR service to at least one of MR service devices 900 disposed in different vehicles on the basis of the generated 3D map data.

Hereinafter, for convenience of description, a cloud or server, which includes the MR AMS server 1100 and the DTaaS server 1200, and provides metadata (e.g., service metadata, 3D assets), a 3D polygon map, and a digital twin map (DT map) all for providing the MR service, is referred to as the MR service cloud 1000.

As shown in FIG. 8B, the MR service device 900 (or MR navigation engine) may include an MR AMS client 910 and an MR renderer 920.

In addition, in order to implement an MR navigation function, which is one of MR services, the MR service device 900 may perform data transmission and reception with the AR service device 800 (or AR engine) and the navigation system 770 disposed in the vehicle.

The MR AMS client 910 may include a context manager 911, a scene manager 913, and a UX scenario database 914.

In addition, the MR renderer 920 may include a DTaaS client 921, an MR visualization unit 922, and a 3D HMI framework 923.

The MR AMS client 910 may collect vehicle location information, user input, user feedback information, payment information, etc. and transmit the collected information to the MR AMS server 1100 existing outside the vehicle.

The MR AMS server 1100 may transmit at least one of metadata, service metadata, and 3D assets required to provide MR services to the MR AMS client 910, based on the information received from the MR AMS client.

The MR AMS client 910 may transmit the data received from the MR AMS server 910 to the MR renderer 920.

The MR renderer 920 may create a digital twin map using a 3D polygon map received from the DTaaS server 1200 and images received from the MR AMS client 910 or the camera 310 installed in the vehicle.

In addition, the MR renderer 920 may render the data received from the MR AMS client 920 into MR objects that can be overlaid on the digital twin map, and generate an MR image by overlaying the rendered MR objects onto the digital twin map.

Then, the MR renderer 920 may output the generated MR image to the display 251 disposed in the vehicle.

All components described herein may be implemented as separate hardware modules, and may be understood as components implemented in software block units as needed.

Hereinafter, each component constituting the MR service platform will be described in more detail with reference to the accompanying drawings.

FIG. 8C is a conceptual view illustrating an MR AMS client according to the present disclosure.

The MR AMS client 910 may be disposed in a vehicle and may provide a Mixed Reality Automotive Meta Service (MR AMS).

The MR AMS client 910 may include a context manager 911 configured to request a context corresponding to a user request (or user input) from the MR AMS server 1100 disposed outside the vehicle, a scene manager 913 configured to manage MR scene information to be output to the display 251 disposed in the vehicle, and a UX scenario database 914 configured to provide UX rules to at least one of the context manager 911 and the scene manager 913.

The MR AMS client 910 may further include an interface API 912 that calls a function for communication with the MR AMS server 1100 disposed outside the vehicle.

The interface API 912 may include one or more functions configured to perform communication with the MR AMS server 1100. The interface API 912 may convert a data format or message format using these functions to transmit data to the MR AMS server 1100 or convert a format of data received from the MR AMS server 1100.

The interface API 921 may transmit a context request output from the context manager 911 to the MR AMS server 1100, and receive a 3D asset corresponding to the context requested by the MR AMS server 912.

Here, the context may indicate situation information and may mean information corresponding to a situation the vehicle is in. Also, the context may include meaning of contents.

The 3D asset may mean 3D object data corresponding to the requested context. In addition, the 3D asset may indicate a 3D graphic object that is overlaid on a digital twin image (or digital twin map) or is newly updatable.

The MR AMS client 910 may be included in the MR service device 900.

The MR service device 900 may include a user interaction handler 901 configured to generate an action corresponding to a user input when the user input is received through the input unit 210 disposed in the vehicle, and transmit the generated action to the context manager.

The user interaction handler 901 may be included either in the MR service device 900 or in the MR AMS client 910.

For example, when a user input of "Find nearby Starbucks" is received through the input unit 210 of the vehicle, the user interaction handler 901 may generate an action (e.g., "Search POI") corresponding to the user input, and transmit the generated action to the context manager 911 disposed in the MR AMS client 910.

For example, the action may be determined by an operation that matches a term included in the user input. The action may also be named a command or control command.

The context manager 911 may generate a command for requesting a context corresponding to the action received from the user interaction handler 901 and transmit the command to the MR AMS server 1100 through the interface API 912.

The command may be generated based on the action (e.g., "Search POI") received from the user interaction handler 901. For example, the command may be generated to include a current location of the vehicle and type and radius information of POI to be found (e.g., GET "Starbucks" (type of POI) WITHIN "500 m" (radius) FROM "37.7795, −122.4201" (current vehicle location (latitude, longitude)).

The context manager 911 may receive current scene information, which is currently being output in the vehicle, from the scene manager 913 and receive UX rules from the UX scenario database 914.

Also, the context manager 911 may receive navigation information including a current route and a current location from the navigation handler 902 that handles information of the navigation system 770.

The navigation handler 902 may be included either in the MR service device 900 or in the MR AMS client 910.

The context manager 911 may generate a command for requesting the context based on at least one of the current scene information, the UX rules, and the navigation information.

The current scene information may include screen information which is currently being output on the display 251 of the vehicle. For example, the current scene information may include information related to an MR image in which an MR object and an MR interface are overlaid on a digital twin map.

In addition, at least one of the context manager 911 and the scene manager 913 of the present disclosure may receive sensor data processed through a sensor data adapter 903, which processes information sensed by the sensing unit 120 of the vehicle.

The sensor data adapter 903 may be included either in the MR service device 900 or in the MR AMS client 910. The sensor data adapter 903 may also transmit the processed sensor data to an AR engine handler 904 that handles data to be transmitted to the AR engine (or AR service device) 800.

The interface API 912 may receive, from the MR AMS server 1100, metadata of the context corresponding to the command and/or 3D assets corresponding to the context.

Then, the interface API 912 may transmit the received metadata and/or 3D asset to the scene manager 913.

The scene manager 913 may generate UI data using the UX rules received from the UX scenario database 914 and the metadata and 3D assets received from the interface API 912.

Thereafter, the scene manager 913 may transmit the generated UI data to the MR renderer 920, which renders the generated UI data to be output in MR or as an MR image to the display 251 disposed in the vehicle.

In addition, the scene manager 913 may further transmit the generated UI data to the AR engine handler 904 that is configured to handle the AR service device 800 disposed in the vehicle.

The UX rules stored in the UX scenario database 914 may refer to information related to rules, shapes, formats, or templates for generating a screen, UX, or user interface to be provided in the MR service device. These UX rules may be previously defined for each type of data.

Also, the UX rules may be updated or modified by a user or administrator.

FIG. 8D is a conceptual view illustrating an MR AMS server according to the present disclosure.

Referring to FIG. 8D, the MR AMS server 1100 which is disposed outside the vehicle and provides the MR AMS may include an interface API 1101 that calls a function for communicating with the MR AMS client disposed in the vehicle, a service aggregation manager 1110 that requests and receives, from a service provider, a context corresponding to a request received from the MR AMS client, and a data integration manager 1120 that loads 3D assets corresponding to the received context from a database (3D assets for MR navigation database 1130.

The interface API 1101 may be named a server interface API 1101 to be distinguished from the interface API 912 of the MR AMS client 910 disposed in the vehicle.

Also, the interface API 912 of the MR AMS client 910 may be named a vehicle interface API or an MR AMS client interface API.

The interface API 1101 disposed in the MR AMS server 1100 may transfer a user request (or context request) received from the MR AMS client to the service aggregation manager 1110.

The interface API may include a first interface API 1101 that calls a function for performing communication with the MR AMS client 910, and second interface APIs 1102a, 1102b, and 1102c through which the service aggregation manager 1110 calls functions for performing communication with service providers 1300a, 1300b, and 1300c.

The second interface APIs 1102a, 1102b, and 1102c may receive service data and/or map data through interface APIs provided in the service providers 1300a, 1300b, and 1300c.

The second interface APIs 1102a, 1102b, and 1102c and the interface APIs provided in the service providers 1300a, 1300b, and 1300c may perform data transmission and reception with each other, and may include functions configured to convert data formats or message formats, so as to perform data transmission and reception with each other by converting the data formats or message formats using those functions.

Based on a type of context requested by the MR AMS client 910 disposed in the vehicle, the service aggregation manager 1110 may request the requested context from a different service provider.

Specifically, when the type of the requested context is a first type, the service aggregation manager 1110 may request the first type of context from the first service provider 1300a, which provides the first type of context. On the other hand, when the type of the requested context is a second type different from the first type, the service aggregation manager 1110 may request the second type of context from the second service provider 1300b, which provides the second type of context.

For example, when the type of the requested context is related to POI (e.g., "Starbucks"), the service aggregation manager 1110 may request the context related to the POI (or POI data) from the first service provider 1300a, and receive the requested context from the first service provider 1300a.

On the other hand, when the type of the requested context is a view of a certain street, the service aggregation manager 1110 may request context (or imagery data) related to the view of the certain street from the second service provider 1300b that provides information related to the view of the street, and receive the requested context from the second service provider 1300b.

Further, when the type of the requested context is a certain service, the service aggregation manager 1110 may request context for the service (or data for the service (e.g., service ratings or prices) from the third service provider 1300c that provides information related to the service, and receive the requested context from the third service provider 1300c.

In addition, the interface API 1101 may request an expanded service API (expand service API calls) from the service aggregation manager 1110, based on the service requested by the MR AMS client 910 (or context request).

The service aggregation manager 1110 may request for information corresponding to the expanded service from the service provider 1300a, 1300b, 1300c based on the expanded service API request, and receive the requested information. The service aggregation manager 1110 may generate a service API using the received information and output the generated service API to the data integration manager 1120.

The data integration manager 1120 may perform data enhancement based on the service API received from the service aggregation manager 1110, generate a metadata package for the requested context, and transmit the generated metadata package to the MR AMS client 910 of the vehicle through the interface API 1101.

The metadata package may include the aforementioned 3D assets and service metadata. Here, the service metadata may mean metadata for providing a service corresponding to a requested context.

The interface API 1101 may transmit the 3D assets loaded from the data integration manager 1120 to the MR AMS client 910.

Meanwhile, the MR AMS server 1100 of the present disclosure may further include the context manager 911 described above.

That is, the context manager 911 may be included in the MR AMS client 910 to be provided on the vehicle side, may be included in the MR AMS server 1100 to be provided on the server (cloud) side, or may be provided on both sides.

When included in the MR AMS server 1100, the context manager 911 may be configured to manage context corresponding to a request received from the MR AMS client 910.

The context manager 911 may include a context handler 911*a* that handles and parses a context request, a context interpreter 911*b* that manages a session for interpreting the context request and generates a context set using data models, and a context graph database (DB) or MR context database 911*c* that stores the data model.

Here, the context handler 911*a* may receive a user request input to the MR AMS client through the interface API 1101, parse the received user request, and transmit the parsed user request to the context interpreter 911*b*.

After generating a session, the context interpreter 911*b* may generate a query for a context request corresponding to the user request, and request and receive a context data model corresponding to the query from the context graph database 911*c*.

The context interpreter 911*b* may request a context corresponding to the context data model from the service aggregation manager 1110, and the service aggregation manager 1110 may request and receive context data corresponding to the context data model from the service provider 1300*a*, 1300*b*, 1300*c*.

The service aggregation manager 1110 may request and receive 3D assets (and/or service metadata) corresponding to the requested context from the data integration manager 1120, and transmit the context data received from the service provider and the 3D assets (and/or service metadata) received from the data integration manager to the context interpreter 911*b*.

The context interpreter 911*b* may transmit the received context data and 3D assets to the MR AMS client 910 disposed in the vehicle through the context handler 911*a* and the interface API 1101.

Meanwhile, the context manager 911 may further include a context recommender 911*d* that extracts a recommended context based on the generated context set, and a context controller 911*e* (or context tracker) that manages a context to be periodically acquired.

When completed context data includes information indicating that a specific service cannot be used, the context recommender 911*d* may request a generation of query for recommending a service, which can replace the specific service, from the context interpreter 911*b*.

Figure 9:
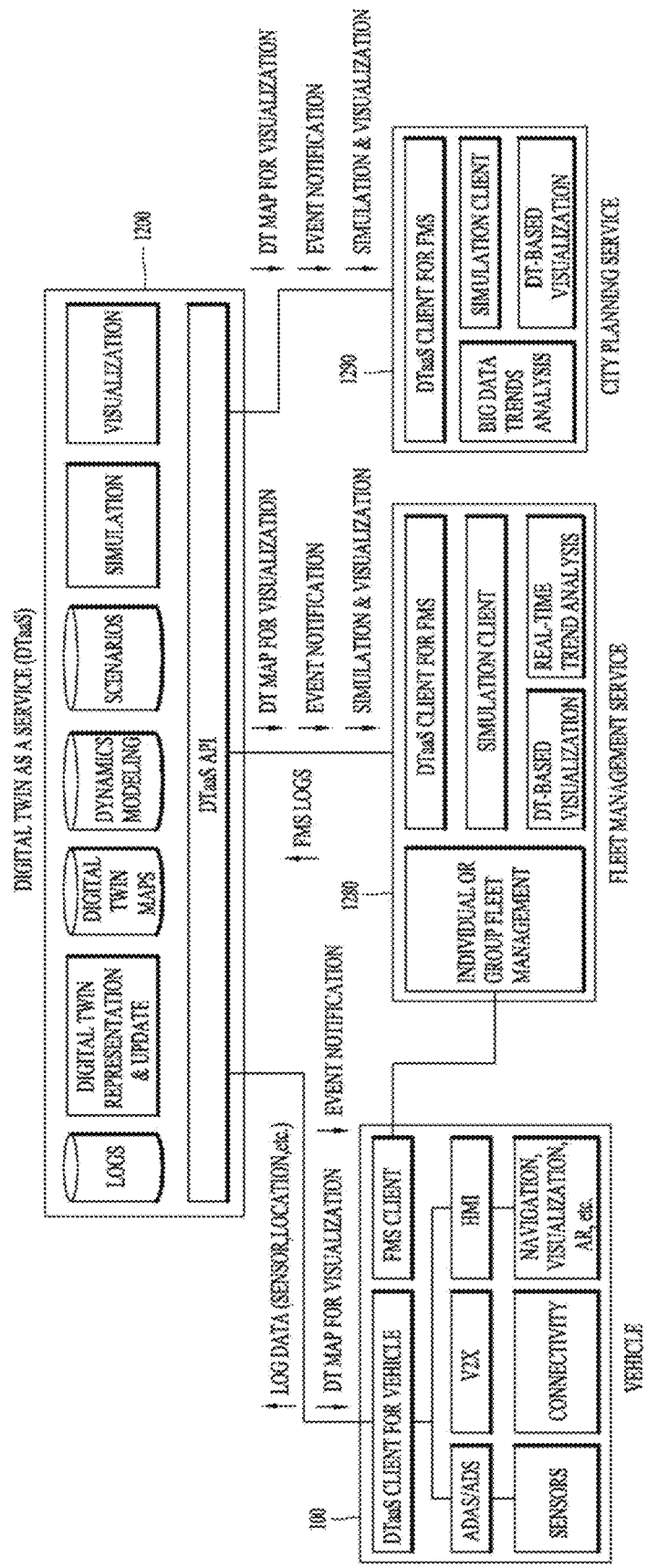
FIG. 9 is a conceptual view illustrating a DTaaS server according to the present disclosure.

FIG. 9 is a conceptual view illustrating a DTaaS server according to the present disclosure.

Referring to FIG. 9, the Digital Twin as a Service or Digital Transformation as a Service (DTaaS) server 1200 of the present disclosure may be disposed outside the vehicle and provide an MR AMS. Specifically, the DTaaS server 1200 may provide a digital twin map or data (e.g., 3D polygon map or all kinds of information regarding objects overlaid on a digital twin), which is necessary to create the digital twin map.

The DTaaS server 1200 may include a DTaaS API 1210 that calls a function for communication with the MR service device 900 disposed in the vehicle, a digital twin maps DB 1220 that stores a digital twin map and a renderable 3D polygon map to be provided to the MR service device, and a processor 1280 that transmits to the MR service device a 3D polygon map corresponding to location information of the vehicle, received from the MR service device, through the DTaaS API.

The DTaaS server 1200 may further include a telecommunication unit (TCU) 1290 that communicates with the MR AMS server 1100 that is disposed outside the vehicle and provides the MR AMS service.

The DTaaS server 1200 may further include a digital twin representation and update unit 1230 that generates a digital twin map by matching an actually-captured image on the 3D polygon map stored in the database 1220.

The DTaaS server 1200 may further include a dynamic modeling database (DB) 1240 that stores dynamic information related to moving objects received from at least one of the MR service device 900 and the MR AMS server 1100, and a scenario database 1250 that stores information related to a scenario to be implemented in a digital twin.

The DTaaS server 1200 may further include a simulation unit 1260 that performs a simulation corresponding to a user request on the digital twin, and a visualization unit 1270 that visualizes information to be implemented on the digital twin.

All of the components described above may be implemented as independent hardware (e.g., chips or modules), and may also be implemented as software-blocked components as needed.

The DTaaS server 1200 may perform data transmission and reception through the DTaaS API 1210 not only with the vehicle 100 but also with a fleet management system (FMS) server 1280 that provides a fleet management service (or vehicle group management service), and a server 1290 that provides a city planning service.

For example, the DTaaS server 1200 may collect log information collected from each server from at least one of the vehicle 100, the FMS server 1280, and the city planning service providing server 1290.

Then, the DTaaS server 1200 may store the collected log information in a log database.

The DTaaS server 1200 may provide a digital twin map for visualization in at least one of the vehicle 100, the FMS server 1280, and the city planning service providing server 1290, based on the collected log information.

In addition, the DTaaS server 1200 may transmit at least one of event notification information, simulation information, and visualization information to at least one of the vehicle 100, the FMS server 1280, and the city planning service providing server 1290 based on the received log information.

In some examples, the vehicle 100 may include a route guide device 1300.

The route guide device 1300 may control at least one of those components illustrated in FIG. 7. From this perspective, the route guide device 1300 may be the controller 170.

Without a limit to this, the route guide device 1300 may be a separate device, independent of the controller 170. When the route guide device 1300 is implemented as a component independent of the controller 170, the route guide device 1300 may be provided on a part of the vehicle 100.

Hereinafter, a description will be given of an example in which the route guide device 1300 is a separate component independent of the controller 170, for the sake of explanation. In this specification, functions (operations) and control methods described in relation to the route guide device 1300 may be executed by the controller 170 of the vehicle. That is, every detail described in relation to the route guide device 1300 may be applied to the controller 170 in the same/like manner.

Also, the route guide device 1300 described herein may include some of the components illustrated in FIG. 7 and various components included in the vehicle. For the sake of explanation, the components illustrated in FIG. 7 and the various components included in the vehicle will be described with separate names and reference numbers.

Figure 10:
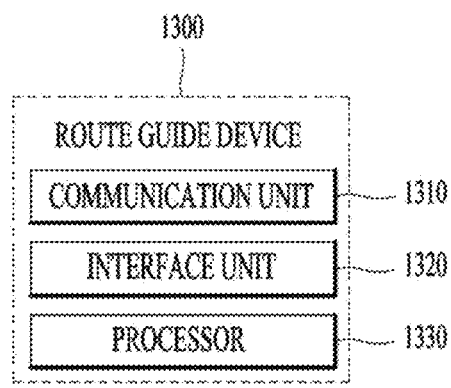
FIG. 10 is a block diagram illustrating a structure of a route guide device according to an embodiment of the present disclosure.

FIG. 10 is a conceptual view illustrating the route guide device 1300.

A route guide device 1300 according to an embodiment of the present disclosure may include a communication unit 1310, an interface unit 1320, and a processor 1330.

The communication unit 1310 may be configured to perform wireless communication with at least one of electrical components included in the vehicle (e.g., the electrical components included in the vehicle illustrated in FIG. 7).

In addition, the communication unit 1310 may perform communication with devices other than the vehicle, for example, mobile terminals, servers, other vehicles, infrastructures located on roads, and the like.

The TCU 1310 may be the communication device 400 described above, and may include at least one of components included in the communication device 400.

The interface unit 1320 may perform communication with at least one of the components disposed in the vehicle.

Specifically, the interface unit 1320 may perform wired communication with at least one of the electrical components included in the vehicle illustrated in FIG. 7.

Specifically, the interface unit 1320 receives sensing information from one or more sensors disposed at the vehicle 100.

In some cases, the interface unit 1320 may be referred to as a sensor data collector.

The interface unit 1320 collects (receives) information sensed by sensors (V.Sensors) disposed at the vehicle for detecting a manipulation of the vehicle (e.g., heading, throttle, break, wheel, etc.) and sensors (S.Sensors) for detecting surrounding information of the vehicle (e.g., Camera, Radar, LiDAR, Sonar, etc.)

The interface unit 1320 may transmit the information sensed through the sensors disposed at the vehicle to the TCU 1310 (or a processor 1330) so that the information is reflected in the HD map.

The interface unit 1320, for example, may serve as a passage with the electrical components disposed in the vehicle through the interface unit 130 of the vehicle.

The interface unit 1320 may exchange data with the interface unit 130 of the vehicle.

The interface unit 1320 may be connected to the vehicle to serve as a path for receiving electrical energy.

For example, the route guide device may be powered on by receiving electrical energy from the power supply unit 190 of the vehicle through the interface unit 1320.

Meanwhile, the route guide device according to the present disclosure may include a processor 1330 for generating a digital twin 3D map using at least one of an image captured by the camera disposed in the vehicle, 2D map information, and 3D map information.

The processor 1330 may overlay (overlap or output) a graphic object related to route guidance on the digital twin 3D map.

Here, the graphic object related to the route guidance indicates an object output in mixed reality (MR), and may include various types of objects (e.g., POI objects, carpet-type objects, 3D objects, etc.) that are necessary to perform the route guidance.

The graphic object related to the route guidance may also be named an MR object.

Hereinafter, a description will be given in detail of a method of generating a digital twin 3D map and a method of performing route guidance using the digital twin 3D map, with reference to the accompanying drawings.

Figure 11A:
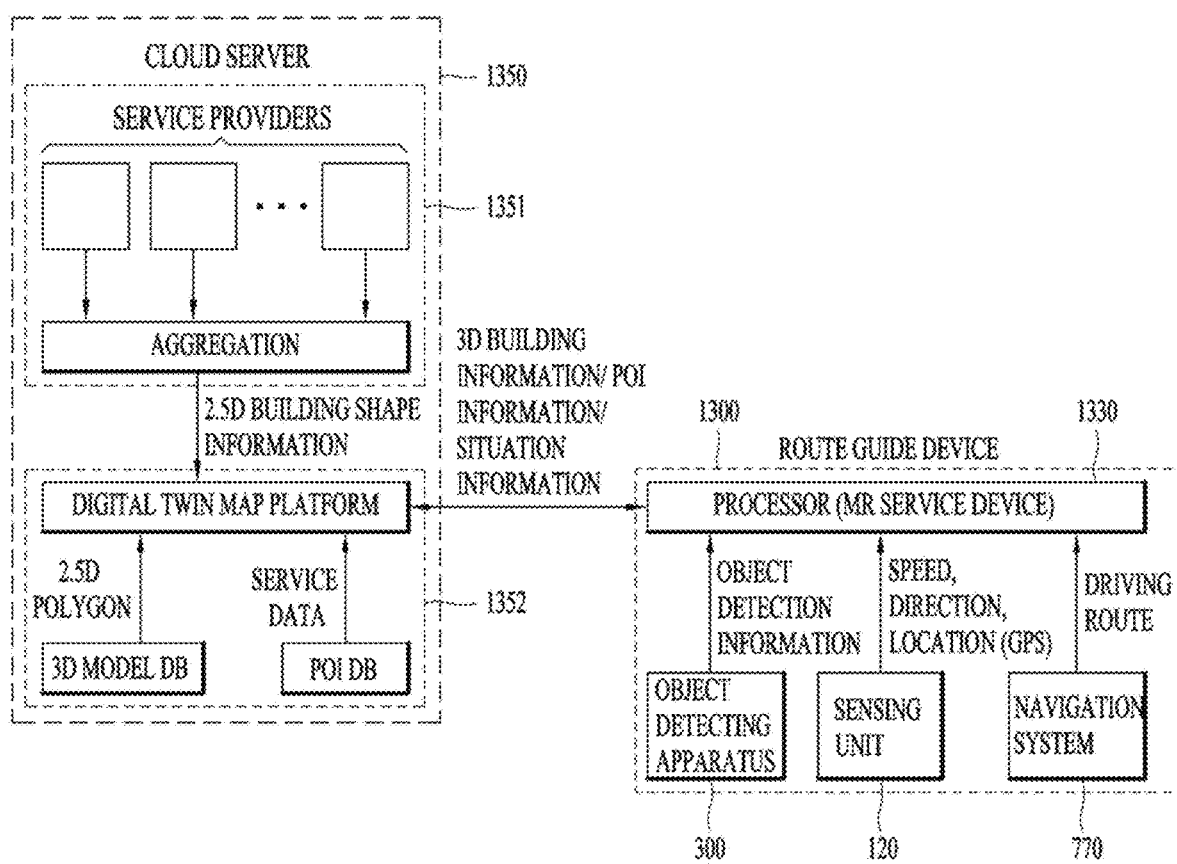
FIG. 11A is a block diagram illustrating a structure of a route guide system including a route guide device and a cloud server according to an embodiment of the present disclosure.

FIG. 11A is a block diagram illustrating a route guide system including a route guide device 1300 and a cloud server 1350 according to an embodiment of the present disclosure.

Referring to FIG. 11A, the MR AMS server 1100 described in FIG. 8D may be connected to various service providers 1351 that provide online map services, such as OSM (Open Street Map), Mapbox, HERE, WRLD, and BingMAP. The MR MAS server 1100 may also aggregate shape information of each building, for example, floor footprint information and height information of a building, which is included in a map based on results of aggregating map data provided from the connected service providers 1351, and provide the aggregated information to the DTaaS 1352. Here, the DTaaS 1352 may indicate a server or device that provides DTaaS, that is, a service using a digital twin map.

Meanwhile, the DTaaS 1352 may be connected to a POI database in which POI service data for each building or area included in map information is stored. In addition, the DTaaS 1352 may be connected to a 3D model database in which data of a 2.5D polygon model for each building included in the map information is stored. Here, the 2.5D polygon model is a polygon model capable of providing a building volume, and may be a polygon model without a texture on a surface thereof. The DTaaS 1352 may receive POI-related service data from the connected POI database, and may receive data of 2.5D polygon models of respective buildings included in map information regarding one area from the connected 3D model database.

A processor 1330 of the MR service device 1300 may receive various types of information related to vehicle driving from the object detecting apparatus 300, the sensing unit 120, and the navigation system 770. For example, the processor 1330 may receive information related to an object detected at the front, rear, or side of the vehicle from the camera 310 of the object detecting apparatus 300. In addition, the processor 1330 may receive information related to vehicle speed, a driving direction of the vehicle, a current location (GPS) of the vehicle, etc. from the sensing unit 120 which includes sensors connected to each component of the vehicle including the driving system 710. In addition, the processor may receive information related to a driving route of the vehicle from the navigation system 770.

Meanwhile, the route guide device 1300 and the DTaaS 1352 may be connected through interface APIs of the MR AMS server 1100. In this case, the route guide device 1300 may have a component corresponding to the MR AMS client 910.

Here, the route guide device 1300 and the interface APIs of the MR AMS server 1100 may be connected through a wireless network connection. In this case, the MR AMS server 1100 may be a network server or a cloud server wirelessly connected to the route guide device 1300.

When connected to the MR AMS server 1100, the route guide device 1300 may provide at least some of information provided from a connected component to the MR AMS server 1100 through a network connection. Then, the MR AMS server 1100 may provide 3D map data for providing mixed reality to the route guide device 1300 in response to the provided information.

For example, the route guide device 1300 may transmit information related to objects detected around the vehicle, and speed, direction, and current location of the vehicle. Further, the MR service device 900 may provide information related to a driving route to the MR AMS server 1100. Then, the MR AMS server 1100 may provide the route guide device 1300 with 3D map data of one area according to the current location of the vehicle based on the information provided by the MR service device 1300.

In this case, the MR AMS server 1100 may determine POI information based on the current location of the vehicle, the speed of the vehicle, and the driving route of the vehicle, and also provide a 3D map data that the determined POI information is further included in the 3D building map. In addition, the MR AMS server 1100 may provide the route guide device 1300 with 3D map data, which further includes information related to situations around the vehicle, based on the provided information of the objects around the vehicle.

Meanwhile, the route guide device 1300 may render an MR image based on the 3D map data provided from the MR AMS server 1100. For example, the route guide device 1300 may control the MR renderer to display a 3D map screen including models for buildings around the vehicle based on the provided 3D map data. In addition, the route guide device 1300 may display a graphic object corresponding to the vehicle on the 3D map screen, and display graphic objects corresponding to the provided POI data and situation information around the vehicle on the 3D map screen.

Therefore, an image of a virtual environment including 3D building models similar to shapes of buildings around the vehicle and a graphic object corresponding to the vehicle may be output to the display 251 such as a CID (Center Information Display), an HUD (Head Up Display), RSI (Rear Sheet Information), or RSE (Rear Sheet Entertainment).

In this case, information related to driving of the vehicle and situations around the vehicle may be provided to the driver through the virtual environment. The route guide device 1300 according to an embodiment of the present disclosure may provide an MR service to the driver through the 3D map information, that is, a digital twin map (hereinafter, referred to as a DT map).

Meanwhile, the MR AMS server 1100 may determine 3D map data and POI information or situation information around each vehicle to be provided together with the 3D map data, on the basis of information collected not only from the route guide device 1300 disposed in one vehicle but also from the route guide devices 1300 disposed in a plurality of vehicles. In this case, the MR AMS server 1100 may collect information from a plurality of vehicles in the form of a cloud server and generate 3D map data for mixed reality based on the collected information. The MR AMS server 1100 may also be configured to transmit MR information for providing an MR service to at least one of route guide devices 1300 disposed in different vehicles on the basis of the generated 3D map data.

Hereinafter, for convenience of description, the DTaaS 1352 and the MR AMS server 1100, which is connected to the DTaaS 1352 to provide 3D map information, that is, a digital twin map (DT map) for providing MR services will be collectively referred to as a cloud server 1350.

Meanwhile, the route guide device 1300 may be a device that controls a display disposed in a vehicle through an interface unit. Alternatively, it goes without saying that the route guide device 1300 may be a display device disposed in a vehicle. In this case, the route guide device 1300, that is, the display device 1300 may include a display, and may receive an updated DT map on which photorealistic texturing is performed from the cloud server, and display an MR view image including the received DT map directly on the display disposed in the route guide device 1300.

For convenience of description, the display device will be named the route guide device 1300.

Figure 11B:
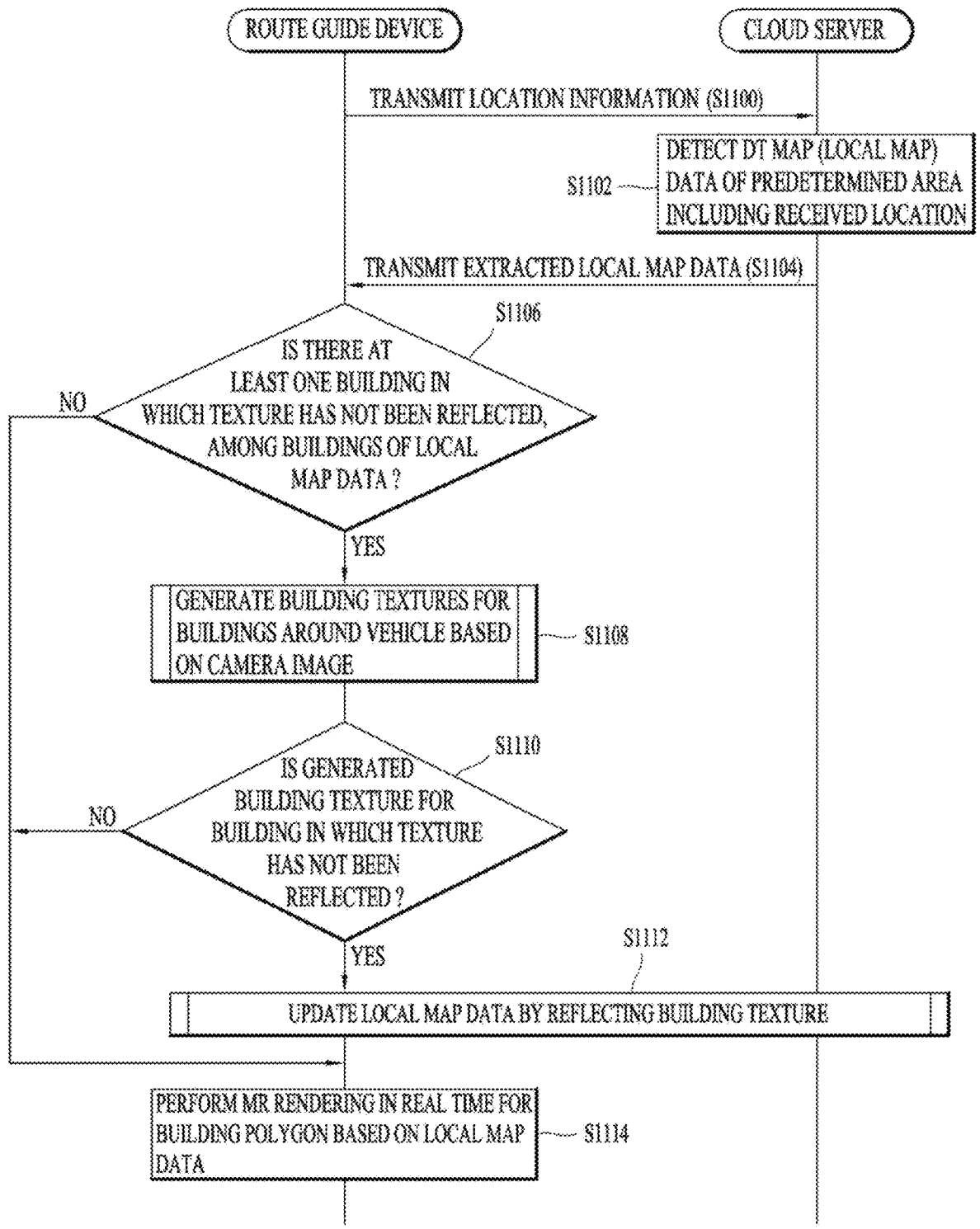
FIG. 11B is a flowchart illustrating an operation process of providing a digital twin map synthesized with building textures through a route guide device and a cloud server in accordance with an embodiment of the present disclosure.

FIG. 11B is a flowchart illustrating an operation process of providing a digital twin map synthesized with a building texture through a route guide device 1300 and a cloud server 1350 in accordance with an embodiment of the present disclosure.

Here, the term 'texture' is for expressing a 3D object more realistically by mapping a 2D image on a surface of a 3D object, and may be provided for generating a realistic 3D object. That is, the route guide device 1300 according to an embodiment of the present disclosure may transmit to the cloud server a real image of a building, to which a texture is not mapped, as a texture image. The cloud server may generate a realistic 3D building model by mapping text images acquired from at least one route guide device 1300 onto one side (lateral) surface of a 3D building model.

Referring to FIG. 11B, first, the route guide device 1300 according to an embodiment of the present disclosure may provide location information, for example, GPS information of the vehicle, which includes the route guide device 1300, to the cloud server 1350 according to an embodiment of the present disclosure (S1100).

Then, the cloud server 1350 may extract DT map data (local map data) of a predetermined area, which includes the location provided from the route guide device 1300 (S1102). In this case, the local map data may be extracted centering on the current location of the vehicle, or may be extracted centering on the location of the vehicle after a preset time, which is estimated according to a driving route and speed of the vehicle. Also, the size of the predetermined area may be determined according to the driving speed of the vehicle.

The cloud server 1350 may transmit the local map data extracted in step S1102 as a response to the location information provided in step S1100 (S1104). Accordingly, the route guide device 1300 may acquire DT map data for providing MR services.

Upon acquiring the DT map data through the step S1104, the route guide device 1300 may detect at least one building in which no texture has been reflected among buildings included in the received map data (S1106).

For example, a model of each building included in the DT map data may have unique identification information (e.g., ID) and may include texture update flag information corresponding to the identification information. In this case, the texture update flag may be checked when a texture update that a texture is mapped to a building model is performed. Accordingly, the route guide device 1300 may determine whether or not the texture update flag of each building included in the received DT map data has been checked, and distinguish a building model for which a texture update has been carried out and a building model for which a texture update has not been carried out.

Meanwhile, when textures are mapped to respective side surfaces of a building model, the cloud server 1350 may determine that the texture update for the corresponding building model has been performed. Therefore, when a texture has not been mapped to any one of the side surfaces of the building model, a texture update flag corresponding to the building model may not be checked. In this case, the route guide device 1300 may not detect the corresponding building model as a building in which a texture has not been reflected in step S1106.

Meanwhile, the texture update flag may be initialized when a preset time elapses. That is, the cloud server 1350 may initialize the texture update flag of the corresponding building after a lapse of a sufficient time, that is, a predetermined time, which is taken to determine that a texture needs to be newly reflected. Then, in step S1106, the route guide device 1300 may detect the building model for which the texture update flag has been initialized as a building in which no texture has not been reflected.

As a result of the detection in step S1106, when there is no building model in which a texture has not been reflected among the buildings of the received local map data, the route guide device 1300 may perform MR rendering for buildings in one area around the vehicle based on the currently received local map data (S1114). In this case, MR rendering is performed by the MR renderer, and may be a process of rendering in real time a 3D building model included in the received local map data, that is, polygon data and various information provided for MR services.

On the other hand, as a result of the detection in step S1106, when there is at least one building model in which a texture has not been reflected among the buildings of the received local map data, the route guide device 1300 may obtain an image around the vehicle from the camera. The route guide device 1300 may generate building textures for buildings around the vehicle from the obtained image (S1108). Here, the route guide device 1300 may identify buildings around the vehicle based on a point cloud according to feature points detected from the obtained camera image, and generate building textures for the identified buildings around the vehicle from the acquired camera image. In this case, the generated building textures may include identification information of the identified buildings, respectively.

Hereinafter, the operation process of step S1108 in which the route guide device 1300 generates building textures for the buildings around the vehicle from the acquired camera image will be described in more detail, with reference to FIGS. 12 to 15.

Meanwhile, when the building texture for the building around the vehicle is generated in step S1108, the route guide device 1300 may determine whether the building texture is for one of 'the at least one building in which the texture has not been reflected' which is detected in step S1106, based on the identification information of the building for which the building texture has been generated (S1110).

As a result of the determination in step S1110, when the generated building texture is a building texture for any one of 'at least one building in which a texture has not been reflected' detected in step S1106, the route guide device 1300 may transmit the building texture generated in step S1108 to the cloud server 1350, such that the cloud server 1350 updates the DT map based on the transmitted building texture (S1112).

In step S1112, the cloud server 1350 may map the building texture received from the route guide device 1300 to a building model corresponding to the building texture. Accordingly, the building texture provided by the path guidance device 1300 may be reflected in one side surface of the building model. Then, the cloud server 1350 may transmit the updated DT map data including the building model in which the building texture has been reflected to the route guide device 1300.

Hereinafter, a description will be given in more detail, with reference to FIGS. 16 and 17, of the map update process of step S1112 of updating the DT map according to the building texture provided from the route guide device 1300 and providing local map data corresponding to the updated DT map to the route guide device 1300 again.

When the local map data including the updated DT map is received in step S1112, the route guide device 1300 may go to step S1114 to perform MR rendering for the building in the one area around the vehicle based on the received local map data. In this case, MR rendering may include rendering a 3D building model of the local map data including the updated DT map data. Accordingly, the building texture generated in step S1108 may be reflected in at least some of the buildings in which the texture has not been reflected.

Figure 13:
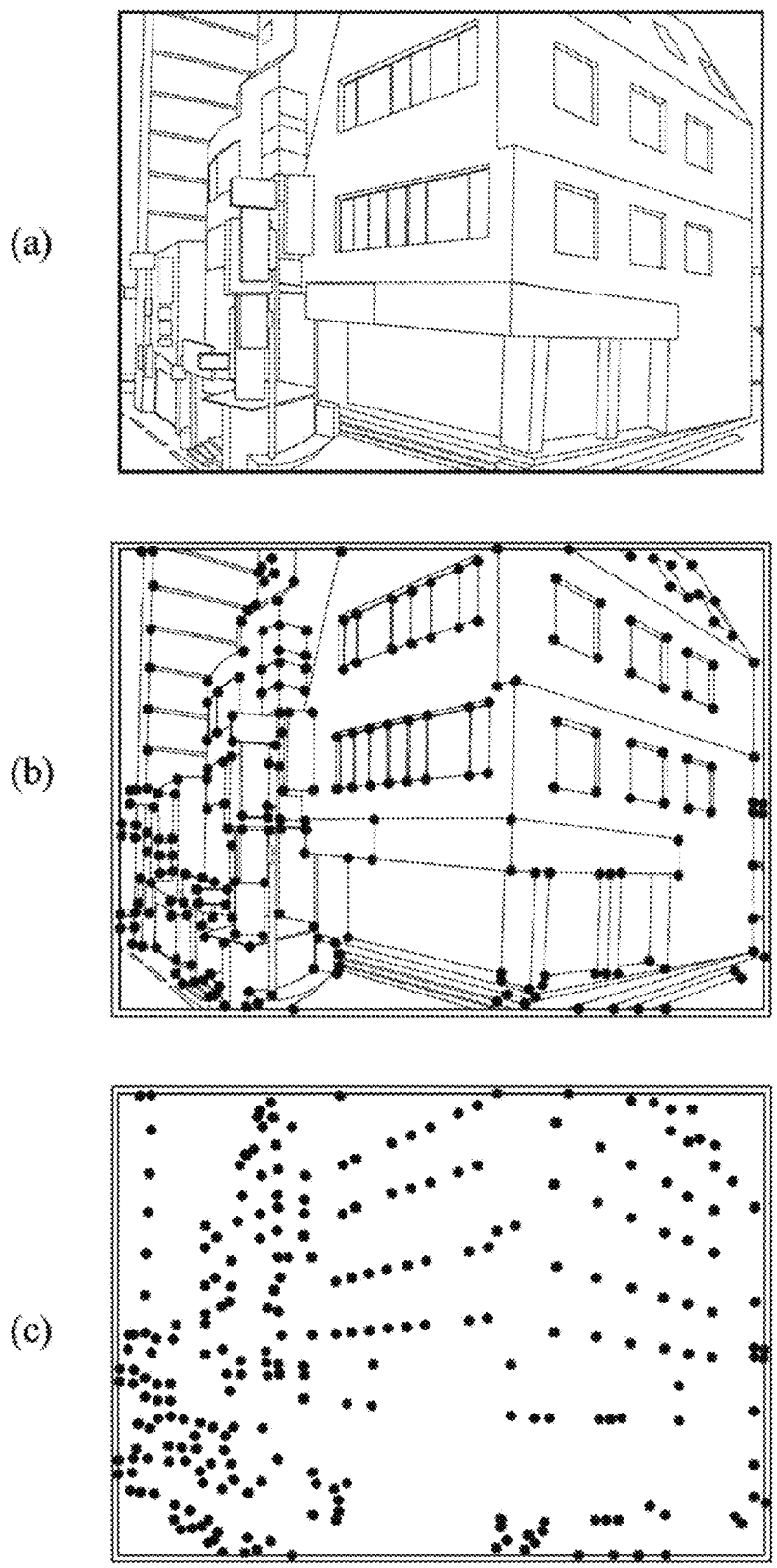
FIG. 13 is an exemplary diagram illustrating an example of extracting a point cloud based on feature points extracted from an image acquired by a camera.

FIG. 12 is a flowchart illustrating an operation process of step S1108 of generating a building texture corresponding to a specific side (lateral) surface of the building from an image obtained by means of a camera during the operation process of FIG. 11. FIG. 13 is an exemplary diagram illustrating an example of extracting a point cloud based on feature points extracted from an image acquired by a camera. FIG. 14 is an exemplary diagram illustrating an example of extracting an image of a building around a vehicle detected according to a 3D map matched through a point cloud and an image of a specific surface of the detected building, and FIG. 15 is an exemplary diagram illustrating an example of generating a building texture corresponding to the specific surface of the building from the image of the specific surface of the extracted building.

First, referring to FIG. 12, when it is determined in step S1106 of FIG. 11 that the local map data received from the cloud server 1350 includes at least one building model, in which no texture has been reflected, the route guide device 1300 may first initialize the received local map data to an initial 3D map (S1200). In this case, the initial 3D map may indicate a 3D map including polygon models that a building texture has not been reflected in each building model.

When the received local map data is initialized to the initial 3D map in step S1200, the route guide device 1300 may receive a surrounding image of the vehicle through a camera (S1202). In this case, the received surrounding image of the vehicle may be a front view of the vehicle. However, the present disclosure is not limited thereto. That is, the surrounding image of the vehicle obtained in step S1202 may be any side view such as a rear, right or left view, in addition to the front view. In this case, an image obtained from the rear side or a specific side may also be used to generate a building texture of a building around the vehicle through the same/like operation process as the operation described in FIG. 12. However, in the following description, for convenience of description, it is assumed that a front image of the vehicle is obtained by the camera.

When the front image of the vehicle is obtained in step S1202, the route guide device 1300 may extract feature points from the acquired image (S1204). Here, the feature points are feature points obtained according to a point cloud method, and may indicate points having different geometric features. Here, the geometric feature may be depth information. In this case, the route guide device 1300 may obtain depth information of each point by using a variation of each point for each frame.

Also, the route guide device 1300 may extract, as the feature points, points where a difference in depth information occurs from the obtained image.

FIG. 13 illustrates an example of detecting feature points according to the point cloud method.

Referring to FIG. 13, a camera image may be acquired as shown in (a) of FIG. 13. Then, the route guide device 1300 may detect points having different depth information, as shown in (b) of FIG. 13, from the obtained camera image. The detected points may be feature points, respectively, according to the point cloud method. Then, the route guide device 1300 may extract the detected feature points from the image and generate a point cloud map as shown in (c) of FIG. 13.

Meanwhile, in step S1204, when the point cloud map is generated based on the feature points detected in the image, the route guide device 1300 may infer a 3D space around the vehicle based on the generated point cloud map (S1206). That is, based on the generated point cloud map, the route guide device may recognize features of shapes of buildings around the vehicle.

The route guide device 1300 may then match the generated point cloud map with a 3D map (initialized 3D map), which includes building polygon models around a location corresponding to a current location of the vehicle (S1208).

The matching may be performed based on SLAM (Simultaneous Localization And Map-Building, Simultaneous Localization and Mapping), which is a map generation technology according to the point cloud method. Here, the point cloud map may be a map generated based on an image obtained by a camera, and the 3D map may be a map generated based on building polygon models. In this case, each area on the point cloud map corresponding to each building polygon model may be identified through the matching in step S1208.

Then, the route guide device 1300 may detect an area corresponding to a polygon model of a specific building from the camera image obtained in step S1202 based on the area on the point cloud map corresponding to the building models around the vehicle. The detected area on the image may be extracted as an image area corresponding to the polygon model of the specific building (S1210).

FIG. 14 illustrates an example of extracting an image area corresponding to a polygon model of a specific building from a received camera image, using a point cloud map and an initialized 3D map that are matched through image matching.

First, referring to (a) of FIG. 14, (a) of FIG. 14 illustrates an example of a 3D map initialized according to step S1200. In this case, building models in the polygon form in which textures have not been reflected may be displayed.

In this state, when the above-described point cloud map and the polygon 3D map are matched, one area on the point cloud map corresponding to a building polygon model included in the 3D map may be detected. For example, an image area 1410 corresponding to a building polygon model 1400 as shown in (a) of FIG. 14 may be detected from the image received from the camera as shown in (b) of FIG. 14.

In this case, the specific building may be any one of at least one building, in which a texture has not been reflected, among building models included in the local map data received in step S1104 of FIG. 11. Alternatively, the specific building may be at least one building determined from at least one condition according to a current location or status of the vehicle.

For example, the specific building may be a building located within a predetermined distance from the vehicle. In this case, the predetermined distance may be determined by a resolution of a camera image. That is, when the camera image obtained in step S1210 is an image having a high resolution, a longer distance may be set as the predetermined distance. On the other hand, when the camera image has a low resolution, a shorter distance may be set as the predetermined distance.

Meanwhile, the image area corresponding to the extracted polygon model of the specific building may be a distorted image of one side surface of the specific building. Here, the distortion may be caused by a photographing direction of the camera and a location of the specific building. Therefore, the route guide device 1300 may calculate the photographing direction based on the location of the vehicle and the location of the specific building, and correct the image of the extracted image area to improve the distortion based on the calculated photographing direction and a direction that the one side surface of the specific building faces (S1212).

For example, the image correction may be an image correction technique of warping the distorted image based on an angular difference between the calculated photographing direction and the direction that the one side surface of the specific building faces. In this case, by the image correction, the image of the extracted image area may be corrected into an image of the one side surface of the specific building viewed from the front, that is, a front-view image. Then, the route guide device 1300 may store the image corresponding to the one side surface of the specific building corrected into the front-view image as a building texture corresponding to the one side surface of the specific building together with identification information related to the specific building (S1214).

FIG. 15 is an exemplary diagram illustrating an example of generating a building texture corresponding to a specific surface of a building from an image of one area extracted from a camera image.

First, referring to (a) of FIG. 15, (a) of FIG. 15 shows an example of detecting image areas 1411, 1412, and 1413 corresponding to building polygon models detected from a camera image, based on matching between a point cloud map and an initialized 3D map.

In this case, the route guide device 1300 may extract an image area 1411 corresponding to a specific building as shown in (b) of FIG. 15. In this case, the specific building may be a building in which a texture has not been reflected or at least one building that meets a preset condition such as a distance from the vehicle, in the received local map data.

Then, as described in step S1212 of FIG. 12, the route guide device 1300 may calculate a difference between a direction that one side surface of a polygon model corresponding to the specific building faces and a photographing angle of the camera image according to the location of the vehicle at the moment when the camera image is received. Also, distortion of the image may be corrected based on the calculated angular difference. Accordingly, the image 1411 of the specific building extracted as shown in (b) of FIG. 15 may be corrected into a front-view image 1500 as shown in (c) of FIG. 15. Then, the route guide device 1300 may store the corrected image, that is, the front-view image 1500 for the one side surface of the specific building as a building texture of the one side surface of the specific building. The route guide device 1300 may also store identification information related to the specific building together with the building texture in order to identify which building polygon model the building texture corresponds to.

Meanwhile, the foregoing description has been given of the example in which the route guide device 1300 generates a building texture corresponding to one side surface of a specific building, but of course, the route guide device 1300 according to an embodiment of the present disclosure may generate building textures for a plurality of side surfaces of the specific building.

For example, when an image acquired by the camera includes both a first side surface and a second side surface of a specific building, the route guide device 1300 may extract image areas for the first and second side surfaces, respectively, through the operation process of FIG. 12, and generate building textures corresponding to the first side surface and the second side surface, respectively, based on images of the extracted image areas.

Meanwhile, the route guide device 1300 may store, together with the generated building texture, building identification information for identifying to which building the generated building texture corresponds, and side surface identification information for identifying to which side surface of the building the generated building texture corresponds.

Therefore, as described above, when the building texture of the first side surface and the building texture of the second side surface are generated for the specific building, different identification information for identifying specific side surfaces of the specific building as well as the identification information of the specific building may be stored to correspond to the building texture of the first side surface and the building texture of the second side surface.

Meanwhile, when the building textures of the specific building are generated through the operation process of FIG. 12, the route guide device 1300 may transmit the generated building textures to the cloud server 1350. Then, the cloud server 1350 may update the DT map based on the building textures collected from the route guide device 1300 and transmit the local map data including the updated DT map to the route guide device 1300.

Figure 16:
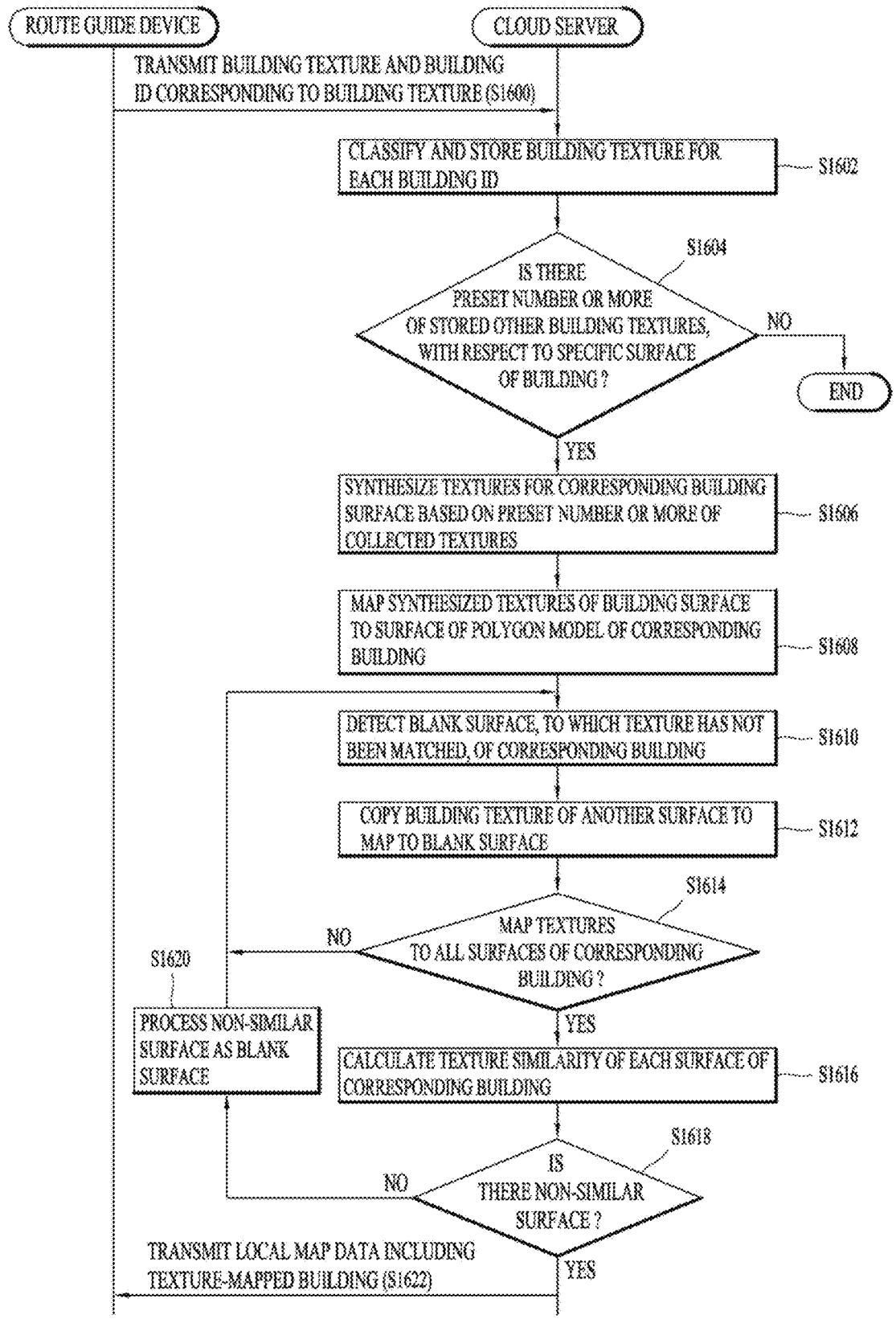
FIG. 16 is a flowchart illustrating an operation process of a cloud server for updating map data to include building textures collected from a route guide device in accordance with an embodiment of the present disclosure.

FIG. 16 is a flowchart illustrating an operation process of a cloud server 1350 for updating map data (DT map) to include building textures collected from a route guide device 1300 in accordance with an embodiment of the present disclosure. In the following description, the cloud server 1350 that updates the DT map may be the MR AMS server 1100 requesting the DTaaS server 1200 to update the DT map. Alternatively, the cloud server 1350 may be the DTaaS server 1200 that updates the DT map according to a request of the MR AMS server 1100.

Referring to FIG. 16, the route guide device 1300 may transmit a building texture generated for updating map data and building identification information (ID) corresponding to the building texture to the cloud server 1350 (S1600). Then, the cloud server 1350 may classify and store the received building texture according to the received building identification information (S1602).

Meanwhile, as described above, when generating a building texture, the route guide device 1300 may further store side surface identification information indicating which side surface of the building the generated building texture corresponds to. In this case, the route guide device 1300 may transmit not only the building identification information but also the side surface identification information together with the building texture to the cloud server 1350 in step S1600. In this case, the cloud server 1350 may identify which side surface of the building the received building texture corresponds to based on the side surface identification information.

When the building texture transmitted from the route guide device 1300 is stored in step S1602, the cloud server 1350 may determine whether a preset number or more of different building textures are stored with respect to the specific side surface of the building corresponding to the building texture (S1604). Here, the different building textures may be building textures collected from route guide devices mounted on a plurality of different vehicles. Alternatively, the different building textures may be building textures that are generated based on camera images photographed in different directions at different time.

And, as a result of the determination in step S1604, when the preset number or more of different building textures are not stored with respect to the specific side surface of the building, the cloud server 1350 may determine that building textures required for updating the DT map are not sufficiently collected. Accordingly, the cloud server 1350 may terminate the process of updating the DT map.

In this case, the cloud server 1350 may transmit a message notifying that an update is not performed, in response to the transmitted building texture, to the route guide device 1300 that has transmitted the building texture. Then, the route guide device 1300 may go to step S1114 of performing real-time MR rendering in FIG. 11B. Here, the MR rendering may be performed by the route guide device 1300 based on the building model included in the local map data, which has been received from the cloud server 1350 in step S1104 of FIG. 11B.

On the other hand, as a result of the determination in step S1604, when the preset number or more of different building textures are stored with respect to the specific side surface of the building, the cloud server 1350 may perform texture synthesis on the specific side surface of the building based on the preset number or more of building textures collected with respect to the specific surface of the building (S1606).

Here, the texture synthesis may be performed by a semantic class label made by artificial intelligence learned based on deep learning. For example, the semantic class label based on deep learning defines and classifies classes for respective pixels of an image according to a pre-learned correct answer label, which may allow each object included in an image to be quickly and accurately identified. In addition, the cloud server 1350 may generate a synthesized building texture corresponding to the specific surface of the building by synthesizing the preset number or more of textures according to a deep neural network (DNN)-generative adversarial network (GAN) algorithm based on the semantic class label.

When the synthesis of the building texture is completed in step S1606, the cloud server 1350 may map the synthesized building texture to the specific side surface of the polygon model corresponding to the identification information of the building. Here, the specific side surface may be a side surface corresponding to the side surface identification information (S1608). Accordingly, a building model having the synthesized building texture formed on one side surface thereof may be generated.

FIG. 17 is an exemplary diagram illustrating an example in which the cloud server 1350 maps the synthesized building texture to a polygon model corresponding to the building in step S1608 of FIG. 16.

Referring to FIG. 17, (a) of FIG. 17 shows a polygon model corresponding to a specific building, which may be a building model to which a building texture has not been mapped. In addition, (b) of FIG. 17 shows an example of a building texture synthesized according to the artificial intelligence algorithm based on the deep learning through step S1606 of FIG. 16 (e.g., the DNN-GAN algorithm based on the semantic class label).

In this case, the cloud server 1350, as shown in (b) of FIG. 17, may map the synthesized building texture to a specific side surface of a specific building identified according to building identification information and side surface identification information. Therefore, as shown in (c) of FIG. 17, a building model in which the synthesized building texture is mapped to one side surface may be generated.

Then, the cloud server 1350 may transmit DT map data of a predetermined area including the building model to which the building texture has been mapped, that is, updated local map data to the route guide device 1300 according to the location of the vehicle, that is, the route guide device 1300.

Then, the route guide device 1300 may receive the updated local map data from the cloud server 1350 in step S1112 of FIG. 11B. The route guide device 1300 may go to step S1114 of FIG. 11B to perform real-time MR rendering according to the updated local map data. Accordingly, an MR service including the building model to which the texture is mapped may be provided.

Meanwhile, when the synthesis of the building texture is completed in step S1606, the cloud server 1350 may further perform a process of synthesizing a building texture to a blank surface according to whether or not there is such a blank surface to which the building texture has not been synthesized, among other side surfaces of the building model to which the building texture has been mapped.

To this end, the cloud server 1350 may further detect whether or not any one of other side surfaces of the building model to which the building texture has been mapped is a bland surface (S1610). Here, the blank surface may indicate one side surface of the building model to which a building texture has not been mapped. Alternatively, the blank surface may indicate one side surface of the building model for which a predetermined number or more of building textures have not been collected. Therefore, a side surface for which a preset number of building textures can be collected may not be included (detected) as the blank surface even if the side surface is the blank surface at the moment.

When one side surface of the building model with the specific side surface to which the building texture has been synthesized is a blank surface, a building texture synthesized to the one of the other side surfaces may be copied and further mapped to the blank surface (S1612). In addition, it may be checked whether textures have been mapped to all side surfaces of the building model (S1614).

As a result of the check in step S1614, when the textures have not been mapped to all the side surfaces of the building model, the cloud server 1350 may go to step S1610 again to detect the blank surface of the building model again.

Then, the cloud server 1350 may go to step S1612 to perform the process of mapping the synthesized building texture again. The cloud server 1350 may then perform the checking process of step S1614 again. That is, the cloud server 1350 may repeatedly perform those steps of S1610 to S1614 for the building model in which the building texture is mapped to the one side surface, so as to map the building textures to all the side surfaces of the building model.

Meanwhile, as a result of the check in step S1614, when the synthesized building texture is mapped to all the side surfaces of the building model, the cloud server 1350 may decide similarity between the building textures mapped to each side surface of the building model (S1616).

Here, the similarity may be decided according to a difference between an overall average RGB value calculated for all pixels on all the side surfaces of the building model to which the building textures have been mapped and an average RGB value calculated for pixels of each side surface (hereinafter, referred to as a side surface average RGB value). That is, the cloud server 1350 may decide the similarity for the one side surface by calculating a side surface average RGB value for pixels of one side surface, to which the building texture has been synthesized, and calculating a difference between the overall average RGB value and the side surface average RGB value calculated for the one side surface. In this way, the cloud server 1350 may decide similarity for each side surface of the building model to which the building texture has been synthesized.

Meanwhile, the cloud server 1350 may detect whether there is a non-similar surface which is not similar to the other side surfaces among the side surfaces of the building model, to which the building textures have been synthesized, based on the similarity of each side surface decided in step S1616 (S1618). Here, the non-similar surface may be one side surface of the building model corresponding to a side surface average RGB value which has a difference of a predetermined value or more from the overall average RGB value.

As a result of the detection in step S1618, when the non-similar surface is detected, the cloud server 1350 may process the detected non-similar surface as a blank surface. Here, processing as the blank surface may mean removing a building texture mapped to the non-similar surface. Then, the cloud server 1350 may go back to step S1610, and perform processes after step S1610. This can prevent a building texture, which is different from that on other side surface, from being mapped to the same building model.

Meanwhile, the similarity decision in step S1616 may be made only for the side surface, to which a copy of the building texture synthesized to the different side surface of the building model is mapped, namely, only for the blank surface. In this case, the cloud server 1350 may perform similarity decision according to step S1616 with respect to the other side surfaces except for the side surface to which the synthesized building texture has been mapped based on building textures collected from a plurality of vehicles. Therefore, even if a side surface has a different texture from the other side surfaces of a building, if the texture is a synthesized texture based on building textures collected from a plurality of vehicles, the side surface may not be designated as a non-similar surface. Therefore, a state in which a texture different from the texture on the other side surfaces of the building model has been mapped to the corresponding side surface may be maintained.

As a result of the detection of the non-similar surface in step S1616, when a non-similar surface is not detected, the cloud server 1350 may transmit, to the route guide device 1300, DT map data of a predetermined area including the building model mapped with the building textures, namely, updated local map data according to the location of the route guide device 1300.

Then, the route guide device 1300 may receive the updated local map data from the cloud server 1350 in step S1112 of FIG. 11B. The route guide device 1300 may go to step S1114 of FIG. 11B to perform real-time MR rendering according to the updated local map data. Accordingly, an MR service including the building model to which the textures have been mapped may be provided.

The foregoing description has been given in detail of the route guide system including the route guide device and the cloud server according to the embodiment of the present disclosure.

Hereinafter, a description will be given of an example of typically providing an MR-based route guidance service provided through a digital twin map using polygon data, and an example of providing an MR-based route guidance service provided through a digital twin map including a building model in which building textures have been reflected according to an embodiment of the present disclosure.

FIG. 18 is an exemplary view illustrating a typical example of an MR-based route guidance service that is provided through a digital twin map using polygon data. Here, (a) of FIG. 18 illustrates an example of a map screen showing a location of a vehicle equipped with a route guide device on a digital twin map provided for an MR service, and (b) of FIG. 18 illustrates an example of an MR-based route guidance service displayed on the display 251 of the vehicle such as a CID, HUD, or RSI or RSE.

Meanwhile, as described above, map data provided by service providers may be generated using images, for example, satellite photos or aerial photos, obtained by capturing the ground by a camera located at a high altitude. Therefore, a photographing angle of an image is at an elevated angle, which makes it difficult to obtain side (lateral) textures of each building. Accordingly, a typical digital twin map may be provided using a polygonal building model produced by floor footprint and height of a building.

Therefore, when an MR-based route guidance service is provided with such a digital twin map, as shown in (b) of FIG. 18, building surfaces around a vehicle may be displayed in a shading manner. This may merely provide a sense of volume similar to that of a real building, and cause a difference between real shapes of buildings around the vehicle and shapes of buildings displayed in an MR image through the display 251, which may cause a driver to feel confused due to a gap difference between the virtual environment provided in MR and a real environment. Such a gap may degrade MR service quality, such as causing the driver to be confused in information provided through the MR service.

On the other hand, the route guide device 1300 according to an embodiment of the present disclosure may generate a building texture corresponding to the side surface of the building from an image of the side surface of the building acquired in the vicinity of the vehicle, as described above. In addition, the cloud server 1350 connected to the route guide device 1300 may collect building textures generated from different images, which are obtained in a plurality of vehicles each provided with the route guide device 1300 by capturing the side surface of the building at different positions, in different directions, and at different angles, and synthesize the collected building textures through an image synthesis algorithm based on learned artificial intelligence (e.g., a DNN-GAN algorithm based on a semantic class label) to generate a synthesized building texture corresponding to the side surface of the building. In addition, the synthesized building texture may be mapped to one side surface of a polygon model corresponding to the side surface of the building, thereby generating a building model in which the building texture based on a real image is reflected in the one side surface of the building.

Accordingly, when an MR-based route guidance service is provided through a digital twin map including a building model in which a building texture is reflected according to an embodiment of the present disclosure, as shown in (b) of FIG. 19, an MR image having a shape more similar to the real world around the vehicle can be provided. This can more improve quality of the provided MR service and allow the driver to more intuitively recognize information provided through the MR image.

Meanwhile, the configuration that the route guide device 1300 according to an embodiment of the present disclosure transmits the location of the vehicle to the cloud server 1350, and the cloud server 1350 transmits the DT map (local map data) of a predetermined area centering on the location of the vehicle on the basis of the location of the vehicle has been described with reference to FIG. 11B. The configuration has also been described in which the route guide device 1300 detects a building in which a texture has not been reflected based on the received local map data, proceeds to steps S1108 to S1112 when there is the building in which the texture has not been reflected, to generate a building texture of the building around the vehicle, and transmits the generated building texture to the cloud server 1350 such that the cloud server 1350 updates the DT map.

Therefore, according to the embodiment of the present disclosure, the DT map update reflecting the building texture may be performed based on the location of the vehicle. In this case, since the route guide device 1300 is mounted on the vehicle and moves along with the movement of the vehicle, the DT map update reflecting the building texture can be performed according to the real-time location of the vehicle which changes along with the driving of the vehicle. Also, in the case of a route on which the vehicle repeatedly travels, the DT map update for buildings around the route on which the vehicle travels may be frequently performed due to building textures collected from the vehicle. Accordingly, in the case of buildings near a route on which the vehicle frequently travels, as the number of collected building textures increases, the cloud server 1350 may generate more elaborate building textures. Therefore, in the case of the buildings near the route on which the vehicle frequently travels, building textures may be more elaborate and detailed. That is, as time passes, building textures may evolve.

Meanwhile, when a texture of a building based on a real image, that is, a realistic building texture is included, the volume of map data provided from the cloud server 1350 may further increase. Moreover, as described above, when the building texture evolves to become more detailed and delicate, a data increase due to the addition of the realistic building textures may further increase. Also, such a data increase may become a load on the cloud server 1350 or cause a bottleneck for the cloud server 1350.

Accordingly, the cloud server 1350 may provide the route guide device 1300 with a DT map in which the realistic building texture has been reflected, only for a predetermined area based on a location of the vehicle or an expected location of the vehicle. In this case, the cloud server 1350 may detect the current location of the vehicle or the expected location of the vehicle based on information collected from the vehicle, that is, location (GPS) information, driving route, driving speed, and the like of the vehicle. In addition, the cloud server 1350 may set an area of a predetermined size around the detected current location or expected location of the vehicle, and provide the route guide device 1300 with a DT map in which the realistic building texture has been reflected only for the set area.

As an example, (a) of FIG. 19 illustrates an example in which the cloud server 1350 provides the route guide device 1300 with a DT map in which a realistic (photorealistic, real) building texture has been reflected only for a predetermined area which is set according to the location of the vehicle.

Referring to (a) of FIG. 19, when the vehicle 1900 equipped with the route guide device 1300 according to an embodiment of the present disclosure is located at a first location 1900-1, the cloud server 1350 may provide the route guide device 1300 with a DT map, in which a photorealistic building texture has been reflected, for a first predetermined area 1910 set around the first location 1900-1. Accordingly, the driver of the vehicle located at the first location 1900-1 may receive an MR service based on the DT map in which the photorealistic building texture has been reflected.

In this case, building models located in areas other than the first predetermined area 1910 may be in a state in which the photorealistic building textures have not been reflected. Therefore, in the case of buildings located in a second predetermined area 1920 that do not overlap the first predetermined area 1910, some of building models may be in a state in which the photorealistic building textures have not been reflected. That is, those buildings may simply be polygon-shaped models.

In this state, the cloud server 1350 may detect a location to which the vehicle 1900 has moved, that is, a second location 1900-2, based on information provided from the route guide device 1300. Then, the cloud server 1350 may provide the route guide device 1300 with a DT map, in which the actual building texture has been reflected, for a second predetermined area 1920 set around the second location 1900-2 to which the vehicle 1900 has moved. Therefore, the driver of the vehicle located at the second position 1900-2, as illustrated in (b) of FIG. 19, may be provided with an MR service in which the realistic building texture has been reflected in the buildings included in the second predetermined area 1920 set based on the second location 1900-2.

On the other hand, the foregoing description has been given of the example of performing texture mapping (photorealistic texturing) only on 3D models of buildings based on the image acquired in the route guide device, but in a similar way, of course, texture mapping may be performed on 3D models corresponding to a road or objects around the vehicle. That is, the route guide device 1300 may acquire a real image of a road or objects around the road based on an image acquired from the vehicle, and perform photorealistic texturing for 3D models of the road or the objects around the road based on the acquired real image. In this case, the objects around the road may include adjacent vehicles.

In addition, the real image acquired by the route guide device 1300 may reflect weather information around the vehicle provided with the route guide device 1300. In this case, different texture images may be obtained for each weather, and the obtained texture images may be transmitted to the cloud server. Therefore, photorealistic texturing reflecting weather information around the vehicle can be performed on the 3D building models around the vehicle.

Meanwhile, the foregoing description has been given of the configuration that the route guide device 1300 according to the embodiment of the present disclosure controls the display disposed in the vehicle through the interface unit, but of course, the route guide device 1300 may also be a display device disposed in the vehicle. In this case, of course, the route guide device 1300, that is, the display device 1300 may receive the updated DT map on which the photorealistic texturing is performed from the cloud server and directly display the received DT map.

Hereinafter, effects of a route guide device and a route guide system according to the present disclosure will be described.

First, in the present disclosure, images of respective side surfaces of a building may be acquired, textures corresponding to the side surfaces of the building may be generated based on the acquired image, and the generated textures may be synthesized on the respective side surfaces corresponding to a building modeling that is provided in a format of polygon data, thereby generating a digital twin map including a building model more similar to a real building. This can provide an advantage of providing a digital twin map having a higher similarity with the real world.

Second, in the present disclosure, textures corresponding to side surfaces of a building may be generated through a cloud server based on images corresponding to the side surfaces of the building photographed in a plurality of vehicles, respectively. Therefore, more accurate textures of respective side surfaces of a building can be synthesized according to images of the side surfaces photographed in various directions and at various angles. This can achieve an advantage of providing a digital twin map that increases a matching rate with the real world as textures are collected.

Third, the present disclosure employs the cloud server 1350 to synthesize a building texture corresponding to one side surface of a specific building based on building textures collected from a plurality of different vehicles, namely may provide a service through a participatory service using the cloud server. Therefore, as more building textures are collected over time, more sophisticated and realistic building textures can be created. This can provide effects of more increasing quality of a DT map provided for an MR service and a coverage capable of providing the MR service over time, and providing a higher quality service at a lower cost.

The present disclosure can be implemented as computer-readable codes (applications or software) in a program-recorded medium. The method of controlling the autonomous vehicle can be realized by a code stored in a memory or the like.

The computer readable medium includes all kinds of recording devices in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device and the like, and may also be implemented in the form of a carrier wave (e.g., transmission over the Internet). The computer may include the processor or the controller. Therefore, the detailed description should not be limitedly construed in all of the aspects, and should be understood to be illustrative. The scope of the present disclosure should be determined by rational interpretation of the appended claims, and all changes within the scope of equivalents of the present disclosure are included in the scope of the present disclosure.

What is claimed is:
1. A display device comprising:
a communication unit configured to communicate with a cloud server;

an interface unit configured to acquire an image around a vehicle by a camera disposed in the vehicle and receive sensing information collected from at least one sensor disposed in the vehicle;

a mixed reality (MR) module configured to render MR information, including at least one virtual object, based on the sensing information and map information received from the cloud server; and a processor configured to extract a building image corresponding to one side surface of a building around the vehicle from the acquired image, generate a texture image corresponding to the one side surface of the building from the extracted building image, transmit the generated texture image to the cloud server, receive from the cloud server updated map information including building models around the vehicle, the building models each having a surface to which a building texture based on the texture image has been mapped, and control the interface unit to output MR information rendered based on the updated map information to a display.

2. The display device of claim 1, wherein the map information provided from the cloud server is map information within a predetermined area set based on a location of the vehicle, and the location of the vehicle is a current location of the vehicle or an expected location of the vehicle estimated based on a driving route, driving speed, and the current location of the vehicle.

3. The display device of claim 2, wherein the processor transmits to the cloud server the texture image generated from the building image corresponding to the one side surface of the building around the vehicle according to a result of detection of a building model with a surface, to which a building texture has not been mapped, among the building models included in the map information received from the cloud server.

4. The display device of claim 3, wherein the processor detects feature points from the image around the vehicle according to a point cloud method, detects one area on a point cloud map that matches a building model corresponding to a specific building around the vehicle, based on a result of three-dimensional (3D) matching between a point cloud map generated based on the detected feature points and the map information provided from the cloud server, and extracts an image area corresponding to one side surface of the specific building from the image around the vehicle based on the detected one area on the point cloud map.

5. The display device of claim 4, wherein the processor generates the point cloud map from the image around the vehicle and performs the 3D matching, based on Simultaneous Localization And Map-Building (SLAM) algorithm.

6. The display device of claim 4, wherein the processor generates a front-view image of the one side surface of the specific building by correcting the extracted image area according to a photographing angle of the camera, and transmits the generated front-view image to the cloud server as a texture image for the one side surface of the specific building.

7. The display device of claim 4, wherein the specific building is a building corresponding to the building model with the surface, to which the building texture has not been mapped, among the building models included in the map information received from the cloud server.

8. The display device of claim 1, wherein the building texture is generated by the cloud server in a manner of synthesizing a plurality of texture images generated based on different images, which are obtained by photographing one side surface of a specific building, and the different images are images having a difference in at least one of a direction, a distance, and a time that the photographing has been performed.

9. The display device of claim 8, wherein the cloud server collects the plurality of texture images from a plurality of different vehicles, generates the building texture corresponding to the one side surface of the specific building when a number of the collected texture images reaches a predetermined number, and maps the generated building texture to the one side surface of the specific building.

10. The display device of claim 8, wherein the building texture is generated by the cloud server in a manner of synthesizing the plurality of texture images according to an artificial intelligence algorithm based on deep learning, and the artificial intelligence algorithm is a Deep Neural Network (DNN)-Generative Adversarial Network (GAN) algorithm based on a semantic class label.

11. A route guide system comprising:

at least one route guide device disposed in a vehicle and configured to transmit a texture image corresponding to one side surface of a specific building based on an image acquired by a camera of the vehicle, receive three-dimensional (3D) map information in response to the transmission, and display mixed reality (MR) information, rendered based on the received 3D map information, on a display of the vehicle; and a cloud server configured to collect a plurality of texture images corresponding to the one side surface of the specific building, map a building texture synthesized from the collected plurality of texture images to one side surface of a polygon model corresponding to the specific building, and provide the at least one route guide device with the 3D map information including polygon models including at least one side surface to which the building texture has been mapped.

12. The route guide system of claim 11, wherein the cloud server comprises:

a Digital Twin as a Service (DTaaS) server configured to provide digital twin map information including polygon models corresponding to respective buildings included in a map area and generated according to floor footprint and height of the buildings, and update the digital twin map information by mapping the building texture synthesized from the plurality of texture images on the one side surface of the polygon model corresponding to the specific building; and a Mixed Reality Automotive Meta Service (MR AMS) server configured to perform communication connection with at least one route guide device, provide a texture image collected from the at least one route guide device to the DTaaS server, and provide the updated digital twin map information provided from the DTaaS server to the at least one route guide device as the 3D map information.

13. The route guide system of claim 12, wherein the cloud server provides the updated digital twin map information for a predetermined area to the route guide device based on location information of the vehicle provided from the route guide device, and the location of the vehicle is a current location of the vehicle or an expected location of the vehicle estimated based on a driving route, driving speed, and the current location of the vehicle.

14. The route guide system of claim 13, wherein the cloud server changes a location of the predetermined area according to a change of the location of the vehicle in response to driving of the vehicle, updates the digital twin map information according to the changed location of the predetermined area, and provides the updated digital twin map information to the route guide device in real time, and the route guide device displays MR information rendered from the updated digital twin map information provided in real time, so as to display polygon models reflecting building textures according to the location of the vehicle that is traveling.

15. The route guide system of claim 11, wherein the cloud server, when the building texture is mapped to one side surface of a specific polygon model, further detects a blank surface to which a building texture has not been mapped among other side surfaces of the specific polygon model, and when there is the blank surface, further maps a building texture mapped to another side surface of the specific polygon model to the detected blank surface.

16. The route guide system of claim 15, wherein the cloud server decides similarity between the building texture mapped to the blank surface and the building textures mapped to the other side surfaces of the specific polygon model based on a difference between an average RGB value for pixels of the blank surface with the building texture mapped thereto and an overall average RGB value for all pixels of the side surfaces of the specific polygon model, and removes the building texture mapped to the blank surface according to the decided similarity.

17. The route guide system of claim 15, wherein the cloud server, when a first number of texture images corresponding to one side surface of a building corresponding to the specific polygon mode are collected, generates a building texture corresponding to the one side surface of the building by synthesizing the collected texture images, and detects as the black surface a side surface corresponding to a second number or less of texture images, smaller than the first number, among the respective side surfaces of the specific polygon model to which the building texture has not been mapped.

* * * * *